United States Patent
Okada

(10) Patent No.: US 10,880,414 B2
(45) Date of Patent: Dec. 29, 2020

(54) PACKET ANALYSIS METHOD AND INFORMATION PROCESSING APPARATUS

(71) Applicant: FUJITSU LIMITED, Kawasaki (JP)

(72) Inventor: Sumiyo Okada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/415,250

(22) Filed: May 17, 2019

(65) Prior Publication Data

US 2019/0379769 A1 Dec. 12, 2019

(30) Foreign Application Priority Data

Jun. 6, 2018 (JP) .................................. 2018-108857

(51) Int. Cl.
*G06F 15/16* (2006.01)
*H04L 29/06* (2006.01)
(Continued)

(52) U.S. Cl.
CPC .............. *H04L 69/22* (2013.01); *H04L 41/12* (2013.01); *H04L 43/12* (2013.01); *H04W 24/08* (2013.01);
(Continued)

(58) Field of Classification Search
CPC ......... H04L 69/22; H04L 41/12; H04L 43/12; H04W 24/08; H04W 56/0005; H04W 74/085
(Continued)

(56) References Cited

U.S. PATENT DOCUMENTS 9,237,164 B2 * 1/2016 Harlacher ............ H04L 63/1425
9,930,057 B2 * 3/2018 Di Pietro ............ H04L 63/1425
(Continued)

FOREIGN PATENT DOCUMENTS

JP    2007-043303    2/2007
WO    2005/079008    8/2005

OTHER PUBLICATIONS

A. P. Snow, U. Varshney and A. D. Malloy, "Reliability and survivability of wireless and mobile networks," in Computer, vol. 33, No. 7, pp. 49-55, Jul. 2000, doi: 10.1109/2.869370. (Year: 2000).*

(Continued)

*Primary Examiner* — Melvin H Pollack
(74) *Attorney, Agent, or Firm* — Fujitsu Patent Center

(57) ABSTRACT

An information processing apparatus includes a processor that acquires first and second packet groups at a predetermined location in a network. The first and second packet groups are wirelessly transmitted from first and second wireless communication devices, respectively, and received by one of a plurality of wireless base stations connected to the network. The processor accumulates the first packet group and the second packet group in a memory in an arrival order. The processor detects a consecutive number of packets in which a first packet among the first packet group and a second packet among the second packet group are accumulated alternately and consecutively one packet at a time in a time series. The processor determines whether the first and second wireless communication devices are connected to a same wireless base station based on the consecutive number.

10 Claims, 24 Drawing Sheets

(51) Int. Cl.
*H04W 56/00* (2009.01)
*H04W 74/08* (2009.01)
*H04L 12/26* (2006.01)
*H04W 24/08* (2009.01)
*H04L 12/24* (2006.01)

(52) U.S. Cl.
CPC ..... *H04W 56/0005* (2013.01); *H04W 74/085* (2013.01)

(58) Field of Classification Search
USPC .......................................................... 709/224
See application file for complete search history.

(56) References Cited

U.S. PATENT DOCUMENTS

| | | | |
|---|---|---|---|
| 9,935,886 B2* | 4/2018 | Okada | H04L 1/1854 |
| 9,985,903 B2* | 5/2018 | Shalev | H04L 69/22 |
| 10,003,538 B2* | 6/2018 | Avci | H04L 47/125 |
| 10,051,546 B2* | 8/2018 | Kato | H04W 40/14 |
| 10,149,121 B2* | 12/2018 | Kim | H04L 5/00 |
| 10,154,053 B2* | 12/2018 | Yadav | H04L 43/062 |
| 10,172,040 B2* | 1/2019 | Tsuda | H04W 52/0209 |
| 10,237,197 B2* | 3/2019 | Chaudhuri | H04L 69/28 |
| 10,284,383 B2* | 5/2019 | Bloch | H04L 12/44 |
| 10,321,210 B2* | 6/2019 | Hayakawa | H04Q 9/02 |
| 10,367,677 B2* | 7/2019 | Parkvall | H04W 52/0245 |
| 10,374,882 B2* | 8/2019 | Sheen | H04W 24/02 |
| 10,425,291 B2* | 9/2019 | Tee | H04L 43/0823 |
| 10,506,044 B1* | 12/2019 | Volpe | G06F 11/30 |
| 10,547,369 B2* | 1/2020 | Patwardhan | H04B 7/0417 |
| 10,555,150 B2* | 2/2020 | Li | H04L 12/66 |
| 10,567,924 B2* | 2/2020 | Yoneda | H04W 28/0205 |
| 10,567,988 B2* | 2/2020 | Harrang | H04L 43/028 |
| 10,641,861 B2* | 5/2020 | Dupray | G01S 5/0257 |
| 10,652,064 B2* | 5/2020 | Liu | H04W 48/12 |
| 10,659,188 B2* | 5/2020 | Dabbagh | H04L 1/0002 |
| 2007/0165580 A1 | 7/2007 | Ebata | |
| 2016/0359695 A1* | 12/2016 | Yadav | G06N 20/00 |
| 2017/0373950 A1* | 12/2017 | Szilagyi | H04L 43/00 |
| 2018/0027293 A1* | 1/2018 | Yamamoto | H04L 65/80 725/86 |
| 2019/0068512 A1* | 2/2019 | Papaloukopoulos | H04L 47/283 |
| 2019/0245751 A1* | 8/2019 | Wong | H04L 45/122 |
| 2019/0349139 A1* | 11/2019 | Park | H04W 76/12 |
| 2019/0349426 A1* | 11/2019 | Smith | H04L 67/104 |
| 2020/0145715 A1* | 5/2020 | Okada | H04N 21/854 |
| 2020/0159207 A1* | 5/2020 | Cella | G05B 23/024 |

OTHER PUBLICATIONS

Muir, A., Garcia-Luna-Aceves, J. An efficient packet sensing MAC protocol for wireless networks. Mobile Networks and Applications 3, 221-234 (1998). https://doi.org/10.1023/A:1019176816001 (Year: 1998).*

Kliazovich, D., Granelli, F. Packet concatenation at the IP level for performance enhancement in wireless local area networks. Wireless Netw 14, 519-529 (2008). https://doi.org/10.1007/s11276-006— (Year: 2008).*

I. Cohen, S. Raz and D. Malah, "Adaptive time-frequency distributions via the shift-invariant wavelet packet decomposition," Proceedings of the IEEE-SP International Symposium on Time-Frequency and Time-Scale Analysis (Cat. No. 98TH8380), Pittsburgh, PA, USA, 1998, pp. 645-648. (Year: 1998).*

J. Himberg, K. Korpiaho, H. Mannila, J. Tikanmaki and H. T. T. Toivonen, "Time series segmentation for context recognition in mobile devices," Proceedings 2001 IEEE International Conference on Data Mining, San Jose, CA, USA, 2001, pp. 203-210, doi: 10.1109/ICDM.2001.989520. (Year: 2001).*

Xu Gang and Zhang Hui, "Advanced methods for detecting unusual behaviors on networks in real-time," WCC 2000—ICCT 2000. 2000 International Conference on Communication Technology Proceedings (Cat. No. 00EX420), Beijing, China, 2000, pp. 291-295 vol. 1, doi: 10.1109/ICCT.2000.889216. (Year: 2000).*

* cited by examiner

ORDER OF PACKETS SUCCESSFULLY TRANSMITTED

FIG. 13

12b PACKET STATE INFORMATION

| RECEPTION TIME | TRANSMISSION SOURCE IP ADDRESS | PACKET SIZE |
| --- | --- | --- |
| 2017/10/17 13:42:54.700 | 192.168.1.101 | 1460 |
| 2017/10/17 13:42:54.700 | 192.168.1.101 | 1460 |
| 2017/10/17 13:42:54.700 | 192.168.1.101 | 1460 |
| 2017/10/17 13:42:54.700 | 192.168.1.101 | 1460 |
| 2017/10/17 13:42:54.700 | 192.168.1.101 | 1460 |
| 2017/10/17 13:42:54.700 | 192.168.1.101 | 1460 |
| 2017/10/17 13:42:54.700 | 192.168.1.101 | 892 |
| 2017/10/17 13:42:54.702 | 192.168.1.101 | 1460 |
| 2017/10/17 13:42:54.703 | 192.168.1.101 | 892 |
| 2017/10/17 13:42:54.703 | 192.168.1.101 | 1460 |
| 2017/10/17 13:42:54.703 | 192.168.1.101 | 1460 |
| 2017/10/17 13:42:54.703 | 192.168.1.101 | 1460 |
| ... | ... | ... |

FIG. 14

12c CONNECTION AP ANALYSIS INFORMATION

| IP ADDRESS OF WIRELESS LAN TERMINAL | IP ADDRESS OF WIRELESS LAN TERMINAL TO BE COMPARED | RATIO |
|---|---|---|
| 192.168.1.101 | 192.168.1.102 | 5% |
| 192.168.1.101 | 192.168.1.103 | 95% |
| 192.168.1.102 | 192.168.1.103 | 80% |
| ... | ... | ... | g1 OUTPUT RESULT

|  | WIRELESS LAN TERMINAL 21 | WIRELESS LAN TERMINAL 22 | WIRELESS LAN TERMINAL 23 |
|---|---|---|---|
| WIRELESS LAN TERMINAL 21 |  | ○ | × |
| WIRELESS LAN TERMINAL 22 | ○ |  | × |
| WIRELESS LAN TERMINAL 23 | × | × |  | g2 OUTPUT RESULT

PACKET ANALYSIS METHOD AND INFORMATION PROCESSING APPARATUS

CROSS-REFERENCE TO RELATED APPLICATION

This application is based upon and claims the benefit of the prior Japanese Patent Application No. 2018-108857 filed on Jun. 6, 2018, the entire contents of which are incorporated herein by reference.

FIELD

The embodiments discussed herein are related to a packet analysis method and an information processing apparatus.

BACKGROUND

In a wireless local area network (LAN), a communication is performed between a wireless LAN terminal and another device via an access point, which is a wireless base station that performs a wireless relay.

In addition, when the communication quality of a wireless LAN is managed, the communication state of the wireless LAN may be analyzed by a packet capturing of acquiring packets that flow through the network in the wired section of the wireless LAN. Also, in such a wireless LAN communication analysis, the connection state between the wireless LAN terminal and the access point is recognized.

As a technique of recognizing the connection state, there is, for example, a technique of extracting an address which takes a wireless interface as a transfer destination from packet transfer information, and estimating the existence of the terminal of the address under the access point which holds the packet transfer information.

Further, there is, for example, a technique in which a terminal having a media access control (MAC) address is stored as an access point that is likely to have within a wireless range, and the existence of a terminal having the MAC address is specified within the wireless range of the most newly stored access point.

Related technologies are disclosed in, for example, International Publication Pamphlet No. WO 2005/079008 and Japanese Laid-open Patent Publication No. 2007-043303.

In the communication analysis of the wireless LAN by the packet capturing in the wired section as described above, it is possible to recognize the communication quality between the wireless LAN terminal and a server. However, since the packet propagating through the wired section does not include the information of the access point connected to the wireless LAN terminal that has transmitted the packet, the communication quality analysis that considers the connected access point may not be performed in the related art.

For example, it is assumed that the communication quality has deteriorated in all the wireless LAN terminals connected to the access point due to the access point. At this time, in the analysis technique of packets propagating through the wired section of the related art, it is possible to detect that the communication quality has deteriorated in a plurality of wireless LAN terminals, but it is not possible to distinguish whether the wireless LAN terminals are connected to the same access point. Therefore, it takes time to specify that the cause of deterioration in communication quality is the access point.

In such a case, when it is possible to determine that the wireless LAN terminal whose communication quality has deteriorated is connected to the same access point, it is possible to predict that the cause of deterioration in communication quality is other than the wireless LAN terminal. Then, it is possible to exclude the wireless LAN terminal from the investigation subject of the deterioration cause, and it is possible to efficiently investigate the cause.

SUMMARY

According to an aspect of the present invention, provided is an information processing apparatus including a memory and a processor coupled to the memory. The processor is configured to acquire a first packet group and a second packet group at a predetermined location in a network. The first packet group is wirelessly transmitted from a first wireless communication device and received by one of a plurality of wireless base stations connected to the network. The second packet group is wirelessly transmitted from a second wireless communication device and received by one of the plurality of wireless base stations. The processor is configured to accumulate the first packet group and the second packet group in the memory in an arrival order. The processor is configured to detect a consecutive number of packets in which a first packet among the first packet group and a second packet among the second packet group are accumulated alternately and consecutively one packet at a time in a time series. The processor is configured to determine whether the first wireless communication device and the second wireless communication device are connected to a same wireless base station based on the consecutive number.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of packet state information;

FIG. 14 is a diagram illustrating an example of connection AP analysis information;

DESCRIPTION OF EMBODIMENTS

Hereinafter, the present embodiments will be described with reference to the accompanying drawings. The respective embodiments may be implemented by combining a plurality of embodiments within a range without contradiction.

First Embodiment

Figure 1:
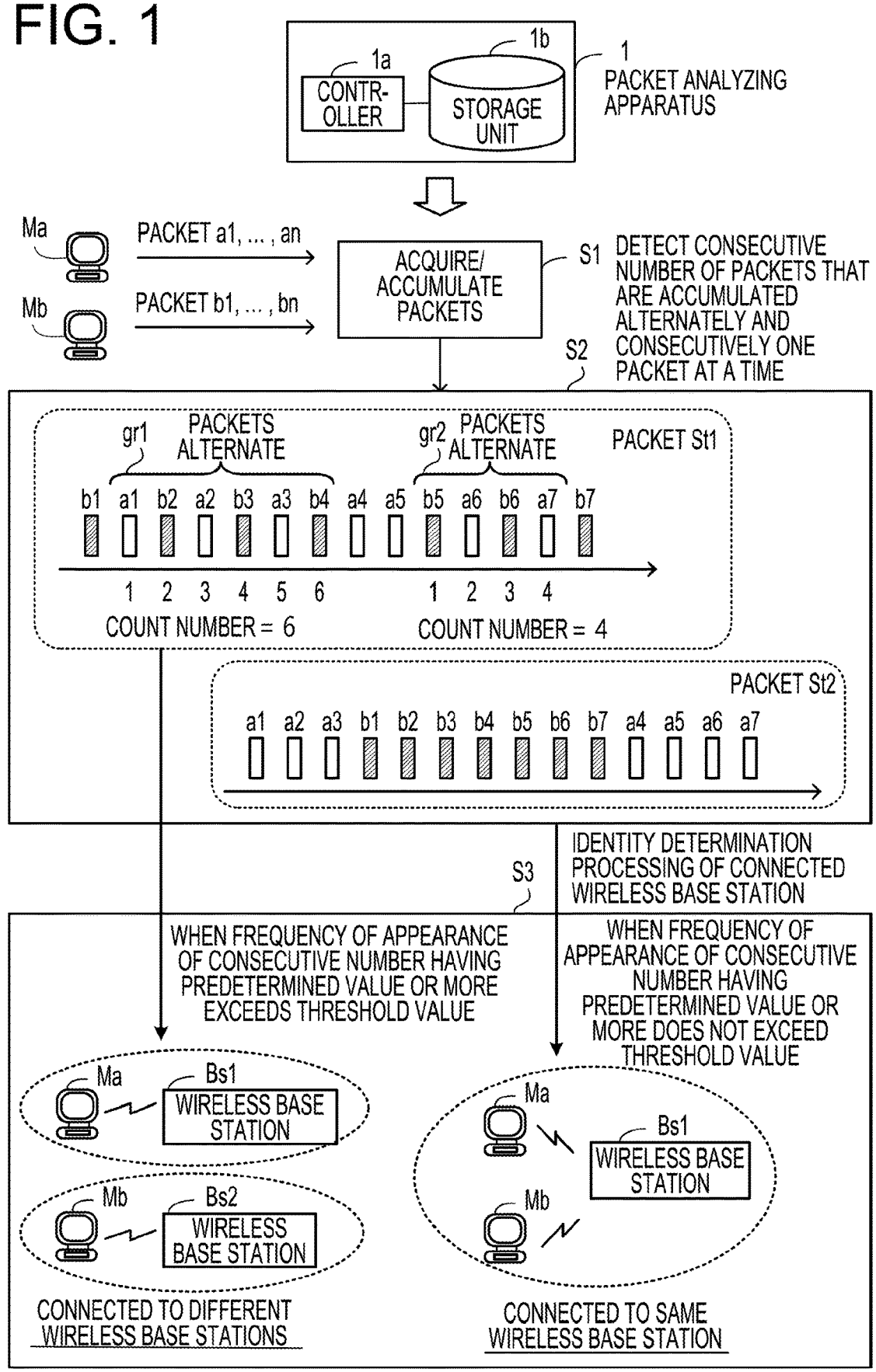
FIG. 1 is a diagram illustrating an example of a function of a packet analyzing apparatus according to a first embodiment.

The first embodiment will be described. FIG. 1 is a diagram illustrating an example of a function of a packet analyzing apparatus according to the first embodiment. The packet analyzing apparatus device 1 is arranged in, for example, a wired network among the networks in which a wireless network and a wired network are combined with each other. Hereinafter, a part of the wireless network is referred to as a wireless section, and a part of the wired network is referred to as a wired section. The packet analyzing apparatus 1 analyzes the communication state of the network by the packet capturing in the wired section.

The packet analyzing apparatus 1 includes a controller 1a and a storage unit 1b. The packet analyzing apparatus 1 is, for example, an information processing apparatus such as a computer. The function of the controller 1a is implemented as, for example, a processor and the function of the storage unit 1b is implemented as, for example, a memory.

The controller 1a acquires a packet group transmitted by a plurality of wireless communication devices Ma and Mb by receiving, for example, packets that pass through an observation point of the wired section. For example, the controller 1a acquires a packet group that is wirelessly transmitted from the wireless communication device Ma and received by any one of the plurality of wireless base stations Bs1 and Bs2 connected to the wired section. Similarly, the controller 1a acquires a packet group that is wirelessly transmitted from the wireless communication device Mb and received by any one of the plurality of wireless base stations Bs1 and Bs2. The controller 1a stores the acquired packet groups in the storage unit 1b in order of arrival.

Further, the controller 1a detects the consecutive number in which packets that belong to different packet groups are accumulated alternately and consecutively one packet at a time. Then, based on the consecutive number, the controller 1a determines whether the wireless communication device Ma and the wireless communication device Mb are connected to the same wireless base station.

The flow of operation will be described using the specific example illustrated in FIG. 1.

[Step S1] In the wireless connection between the wireless communication device Ma and the wireless base station, it is assumed that the wireless communication device Ma is transmitting packets a1, . . . , a7 to the wireless base station. Further, in the wireless connection between the wireless communication device Mb and the wireless base station, it is assumed that the wireless communication device Mb is transmitting packets b1, . . . , b7 to the wireless base station.

The controller 1a acquires a packet group including the packets a1, . . . , a7 that are transmitted from the wireless communication device Ma, and a packet group including the packets b1, . . . , b7 that are transmitted from the wireless communication device Mb, and accumulates the packet groups in order of arrival.

[Step S2] The controller 1a detects the consecutive number in which one packet among the packets a1, . . . , a7 and one packet among the packets b1, . . . , b7 are accumulated alternately and consecutively one packet at a time.

For example, in a state St1, groups gr1 and gr2 are arranged in a sequence of packets that are accumulated alternately and consecutively one packet at a time. The consecutive number of the group gr1 is 6 and the consecutive number of the group gr2 is 4.

Further, since both sides of the packet a5 are the packets a4 and b5, and the packet a4 is the same as the packet a5 in the transmission source device serving as the wireless communication device Ma, the packet a5 is not included in the count of the consecutive number. In addition, the packet b7 is not included in the count of the consecutive number since a determination may not be performed because there is only one packet on one side (the method of counting the consecutive number will be described later). In the meantime, in a state St2, since there are not packets that are accumulated alternately and consecutively one packet at a time, the consecutive number is 0.

[Step S3] The controller 1a compares the appearance frequency of the consecutive number which is equal to or greater than a predetermined value with a threshold value. When the appearance frequency of the consecutive number equal to or greater than the predetermined value exceeds the threshold value, the controller 1a determines that the wireless communication device Ma and the wireless communication device Mb are connected to mutually different wireless base stations.

For example, assuming that the predetermined value is 3 and the threshold value is 1, since the consecutive number of 6 and the consecutive number of 4 appear in the state St1, all consecutive numbers are equal to or greater than the predetermined value 3. Meanwhile, since the appearance frequency is 2, the value exceeds the threshold value 1.

Therefore, the controller 1a determines that the wireless communication device Ma and the wireless communication device Mb are connected to mutually different wireless base stations (Bs1 or Bs2). For example, as illustrated in FIG. 1, the wireless communication device Ma is connected to the wireless base station Bs1, and the wireless communication device Mb is connected to the wireless base station Bs2.

In the meantime, in the state St2, since the consecutive number is 0, the appearance frequency is also 0 and does not exceed the threshold value. Therefore, the controller 1a determines that the wireless communication device Ma and the wireless communication device Mb are connected to the same wireless base station (Bs1 or Bs2). For example, as illustrated in FIG. 1, the wireless communication devices Ma and Mb are in a state of being connected to the same wireless base station Bs1.

In the packet analyzing apparatus 1, as described above, among the plurality of packet groups acquired in the wired section of the network, packets that belong to the first packet group and packets that belong to the second packet group detect the consecutive number of packets which are accumulated alternately and consecutively one packet at a time, and determines whether a plurality of wireless communication devices are connected to the same wireless base station based on the consecutive number.

Thus, the identity of the wireless base station (Bs1 or Bs2) connected to the plurality of wireless communication devices Ma and Mb may be determined by monitoring packets in the wired section. Since it is possible to determine the identity of the wireless base station (Bs1 or Bs2) to which a plurality of wireless communication devices Ma and Mb are connected, it becomes easy to distinguish the portions where the communication quality has deteriorated.

For example, it is assumed that the communication quality of the wireless communication devices Ma and Mb is analyzed to have deteriorated with respect to the wireless communication devices Ma and Mb, and the wireless communication devices Ma and Mb are determined to be connected to the wireless base station Bs1.

In this case, since deterioration in communication quality has occurred in both of the wireless communication devices Ma and Mb connected to the same wireless base station Bs1, it may be determined that there is a high possibility that the cause of deterioration exists on the wireless base station Bs1 side, rather than the wireless communication devices Ma and Mb sides.

Further, when the cause of deterioration is on the wireless base station Bs1 side, it includes a case where the wireless base station Bs1 itself has a cause of deterioration and a case where there is a cause of deterioration in another part related to the wireless base station Bs1. For example, even when there is a cause of deterioration somewhere in the wired section connected to the wireless base station Bs1, it includes a case where the cause of deterioration is on the wireless base station Bs1 side.

Further, it is assumed that the communication quality of the wireless communication device Ma is analyzed to have deteriorated with respect to the wireless communication devices Ma and Mb, and the wireless communication devices Ma and Mb are determined to be connected to the same wireless base station Bs1.

In this case, since deterioration in communication quality has occurred only in the wireless communication device Ma among the wireless communication devices Ma and Mb connected to the same wireless base station Bs1, it may be determined that there is a high possibility that the cause of deterioration exists on the wireless communication device Ma side, rather than the wireless base station Bs1 side.

As described above, when deterioration in the communication quality of wireless communication is recognized by the above function of the packet analyzing apparatus 1, it becomes easy to distinguish whether the wireless communication device or the side other than the wireless communication device (e.g., wireless base stations Bs1 and Bs2) is the cause of deterioration.

Further, when determining the identity of the connected wireless base stations, it is also possible to perform a more accurate determination by setting a predetermined period (corresponding to the analysis period and the same AP determination period to be described later). For example, the controller 1a detects a first maximum value of the consecutive number for each first period based on a first packet group and a second packet group, which are acquired within a second period (the same AP determination period) that includes n times (n is an integer of 1 or more) a first period to be analyzed (analysis period). Further, the controller 1a calculates the ratio of a second maximum value at which the value is equal to or greater than the predetermined value, among the n first maximum values in the first period of n times. Then, when the ratio exceeds the threshold value, the controller 1a determines that the wireless communication devices Ma and Mb are connected to different wireless base stations, and when the ratio does not exceed the threshold value, the controller 1a determines that the wireless communication devices Ma and Mb are connected to the same wireless base station. In this way, it is possible to perform the determination efficiently and accurately by conducting the identity determination processing based on the ratio of appearance of the consecutive number obtained by setting a predetermined period.

Further, it is possible to prevent an erroneous determination result from being obtained by excluding the first period from the targets of the identity determination of the wireless base stations Bs1 and Bs2. For example, when the communication amounts of the packet groups a1, . . . , a7 and the packet groups b1, . . . , b7, which are acquired within a certain analysis candidate period (first analysis candidate period), are equal to or less than a predetermined value, the controller 1a excludes the first analysis candidate period from the first period.

Further, when the packet sizes of the packets acquired within a certain analysis candidate period (second analysis candidate period) are equal to or less than a predetermined size, the controller 1a may exclude the second analysis candidate period from the first period. As a result, it is possible to prevent an erroneous determination result from being obtained.

Further, when the condition is not satisfied that the connection being used for communication of the packets acquired within a third analysis candidate period has been continuously established from the beginning to the end of the third analysis candidate period, the controller 1a may exclude the third analysis candidate period from the first period. For example, when the connection establishment or termination procedure is not performed within the third analysis candidate period, the connection is continuously established from the beginning to the end of the third analysis candidate period. When the connection is not continuously established within the analysis candidate period, it is possible to prevent an erroneous determination result from being obtained by excluding the analysis candidate period from the first period.

Next, descriptions will be made a case where when a plurality of wireless communication devices are connected to different wireless base stations, the frequency of packets appearing alternately one packet at a time becomes high, and when the wireless communication devices are connected to the same wireless base station, the frequency of packets appearing alternately one packet at a time becomes low.

When the wireless communication devices Ma and Mb are connected to mutually different wireless base stations, the packets transmitted from the wireless communication devices Ma and Mb join at observation points in the wired section, and are queued in an order of arrival by the packet analyzing apparatus 1.

Therefore, when the communication rates of the wireless communication devices Ma and Mb are the same, the frequency becomes high in which the packets transmitted from the wireless communication device Ma and the packets transmitted from the wireless communication device Mb are accumulated alternately and consecutively one packet at a time in a time series.

In the meantime, when the wireless communication devices Ma and Mb are connected to the same wireless base station, the packets transmitted from the wireless communication devices Ma and Mb join in the wireless section, the frequency becomes low in which the packets transmitted from the wireless communication device Ma and the packets transmitted from the wireless communication device Mb are accumulated alternately. This is related to the transmission waiting time of the wireless communication devices Ma and Mb. Hereinafter, descriptions will be made on the reason why the alternate appearance of packets is lowered when the wireless communication devices Ma and Mb are connected to the same wireless base station. In the following description, the wireless communication device is referred to as a wireless LAN terminal and the wireless base station is referred to as an access point (AP).

<Back-Off Time>

In the communication procedure of the carrier sense multiple access with collision avoidance (CSMA/CA) of the wireless LAN, a random time to wait for frame transmission is provided in order to avoid collision of frames transmitted from the wireless LAN terminal. The standby time for frame transmission is called a back-off time.

Figure 2:
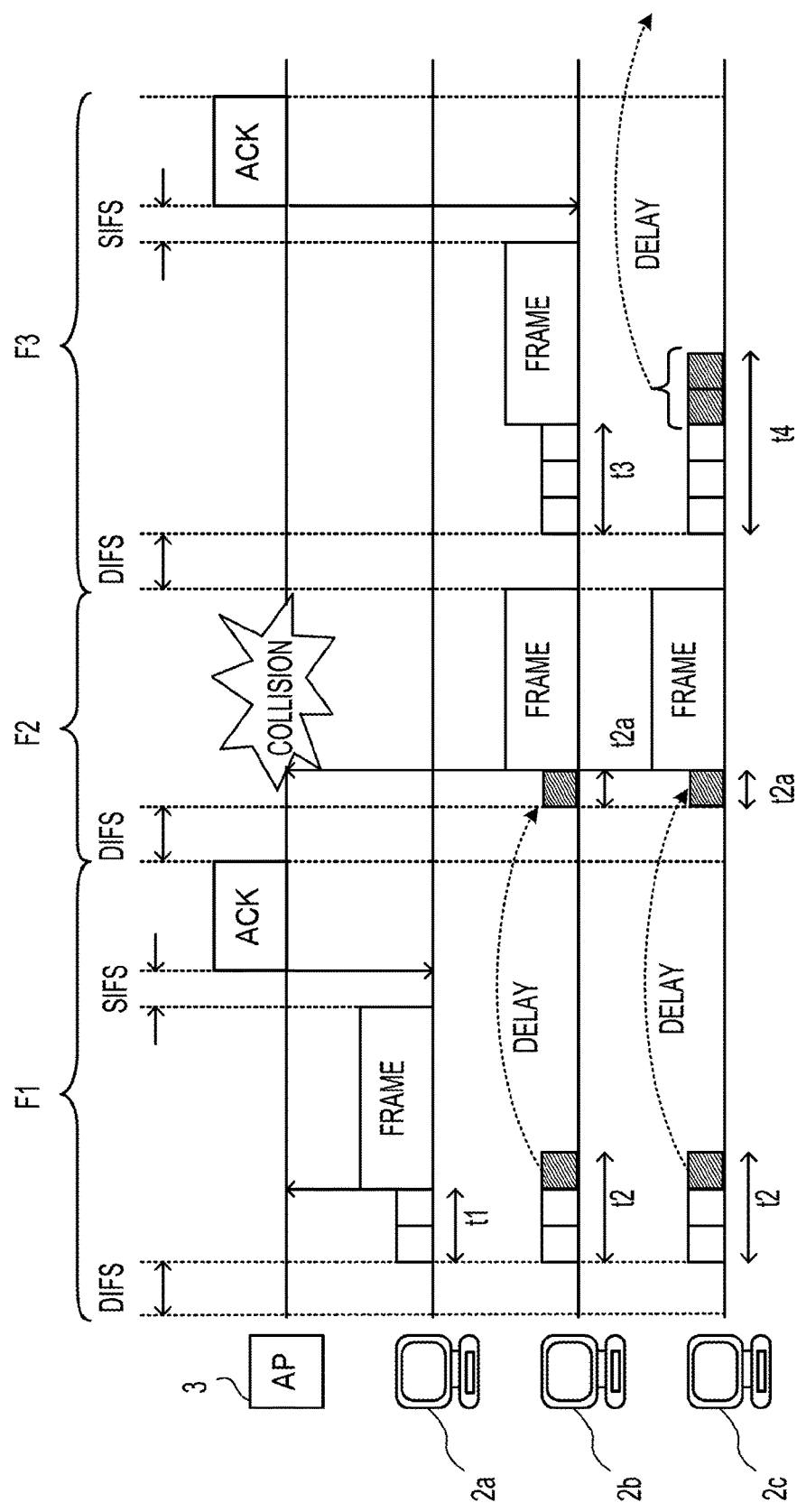
FIG. 2 is a diagram for explaining a back-off time.

FIG. 2 is a diagram for explaining a back-off time. It is assumed that wireless LAN terminals 2a, 2b, and 2c are connected to AP3.

[Transmission Phase F1] Each of the wireless LAN terminals 2a, 2b, and 2c transmits frames after a lapse of a back-off time which is managed by each terminal having a fixed idle time called the distributed coordination function inter frame space (DIFS).

In this example, the wireless LAN terminal 2a sets the back-off time t1, and the wireless LAN terminals 2b and 2c set the back-off time t2 (t1<t2).

In a transmission phase F1, since the back-off time t1 is the shortest, the wireless LAN terminal 2a transmits frames after the back-off time t1 elapses. Upon successful reception of the frames, the AP3 returns an ACK frame for acknowledgment with a fixed idle time called the short inter frame space (SIFS).

Further, since the frames cannot be transmitted in the transmission phase F1, the wireless LAN terminals 2b and 2c delay the back-off times to the next transmission phase.

[Transmission Phase F2] It is assumed that the wireless LAN terminals 2b and 2c have delayed one slot time out portion of the back-off time t2 (the delayed slot time is taken as back-off time t2a).

The wireless LAN terminals 2b and 2c transmit frames after a lapse of the back-off time t2a with a time interval of DIFS from the end point of the ACK frame of the AP3. At this time, since the back-off times of the wireless LAN terminals 2b and 2c are the same, a frame collision occurs.

[Transmission Phase F3] When a frame collision occurs, the ACK frame is not returned from the AP3. For this reason, the wireless LAN terminals 2b and 2c recognize that the frame transmission has failed, reset the back-off time, and retransmit the frame.

In this example, the wireless LAN terminal 2b sets the back-off time t3, and the wireless LAN terminal 2c sets the back-off time t4 (t3<t4). In this case, the wireless LAN terminal 2b transmits the frames after the back-off time t3 elapses. Upon successful reception of the frames, the AP3 returns an ACK frame for an acknowledgment of reception.

Since the frames cannot be transmitted in the transmission phase F2, the wireless LAN terminal 2c delays the back-off time to the next transmission phase.

<Increase in Back-Off Time Associated with Retransmission>

Figure 3:
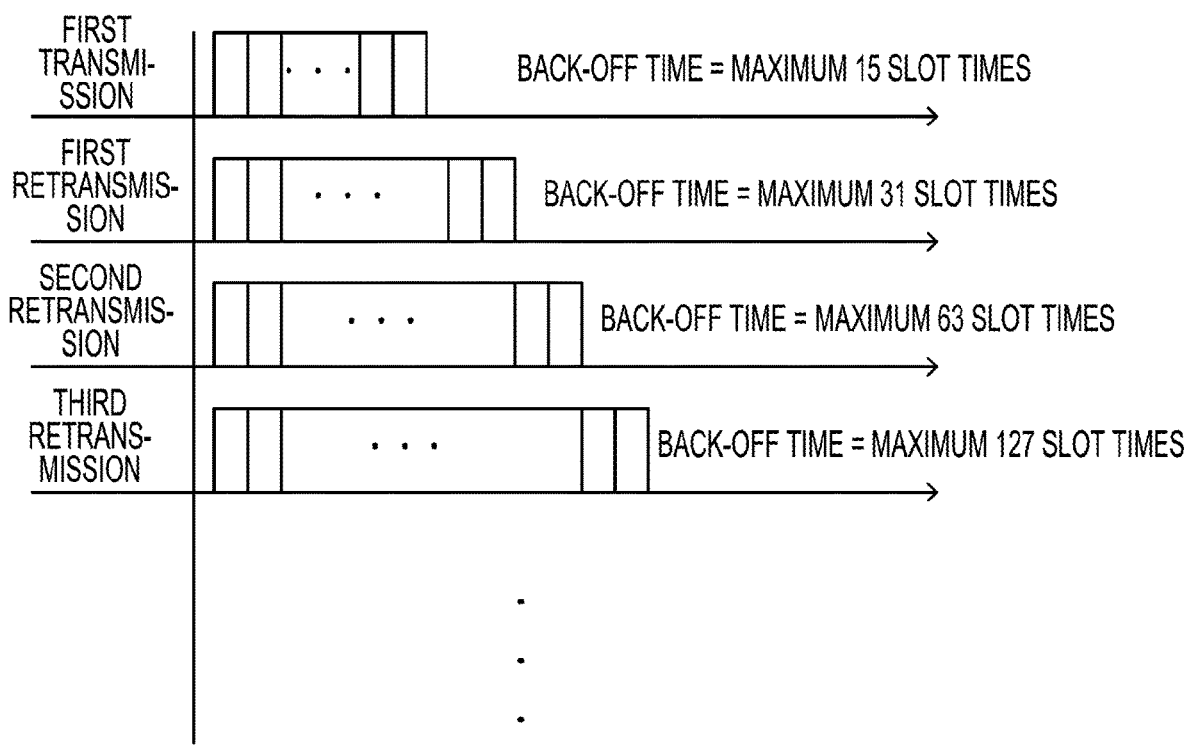
FIG. 3 is a diagram illustrating an example of increase in back-off time that is associated with retransmission.

FIG. 3 is a diagram illustrating an example of an increase in the back-off time that is associated with retransmission. The back-off time is a multiple of the slot time of a fixed time and is calculated by (random value)×(slot time). Also, when "n" is assumed to be the number of retransmissions, the random value is determined from an integer within the range from 0 to less than 2 to the $n^{th}$ power. Therefore, as illustrated in FIG. 3, as the number of retransmissions increases, the back-off time also increases.

Here, when the frames transmitted from a plurality of wireless LAN terminals collide, a retransmission occurs. When a retransmission occurs, the back-off time becomes longer, and when the back-off time becomes longer, the transmission interval becomes longer. When the transmission interval becomes longer, the possibility that a frame of another wireless LAN terminal enters between the frames becomes high.

Since the probability of an occurrence of a frame collision differs depending on the signal strength of the wireless LAN terminal, the wireless LAN terminal having a weak signal strength has a higher probability of frame collision, and a continuous retransmission is likely to occur. Therefore, the possibility of appearing alternately one packet at a time is low, which means that there is a high possibility that two wireless LAN terminals are connected to the same AP.

<Situation Where Packets of Different Packet Groups Do Not Appear Alternately>

Figure 4:
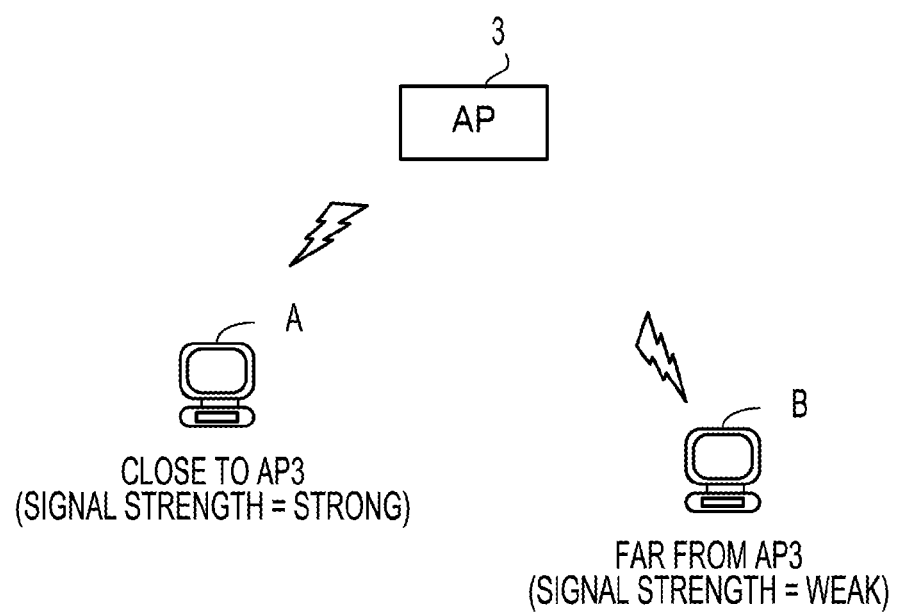
FIG. 4 is a diagram illustrating a connection example between an AP and wireless LAN terminals.

Next, a situation where the packets of different packet groups among two packet groups do not alternately appear will be described with reference to FIGS. 4 to 8. FIG. 4 is a diagram illustrating a connection example between an AP and wireless LAN terminals. The wireless LAN terminals A and B are connected to the AP3. It is assumed that the wireless LAN terminal A is located closer to the AP3 than the wireless LAN terminal B, and the signal strength of the wireless LAN terminal A is stronger than the signal strength of the wireless LAN terminal B.

When the frames transmitted by the wireless LAN terminals A and B are not normally received by the AP3, that is, when the ACK does not return from the AP3, the wireless LAN terminals A and B retransmit the frames. When a frame collision occurs or when an error (bit error) occurs as the AP3 receives the frame, the AP3 cannot normally receive the frames.

Figure 5:
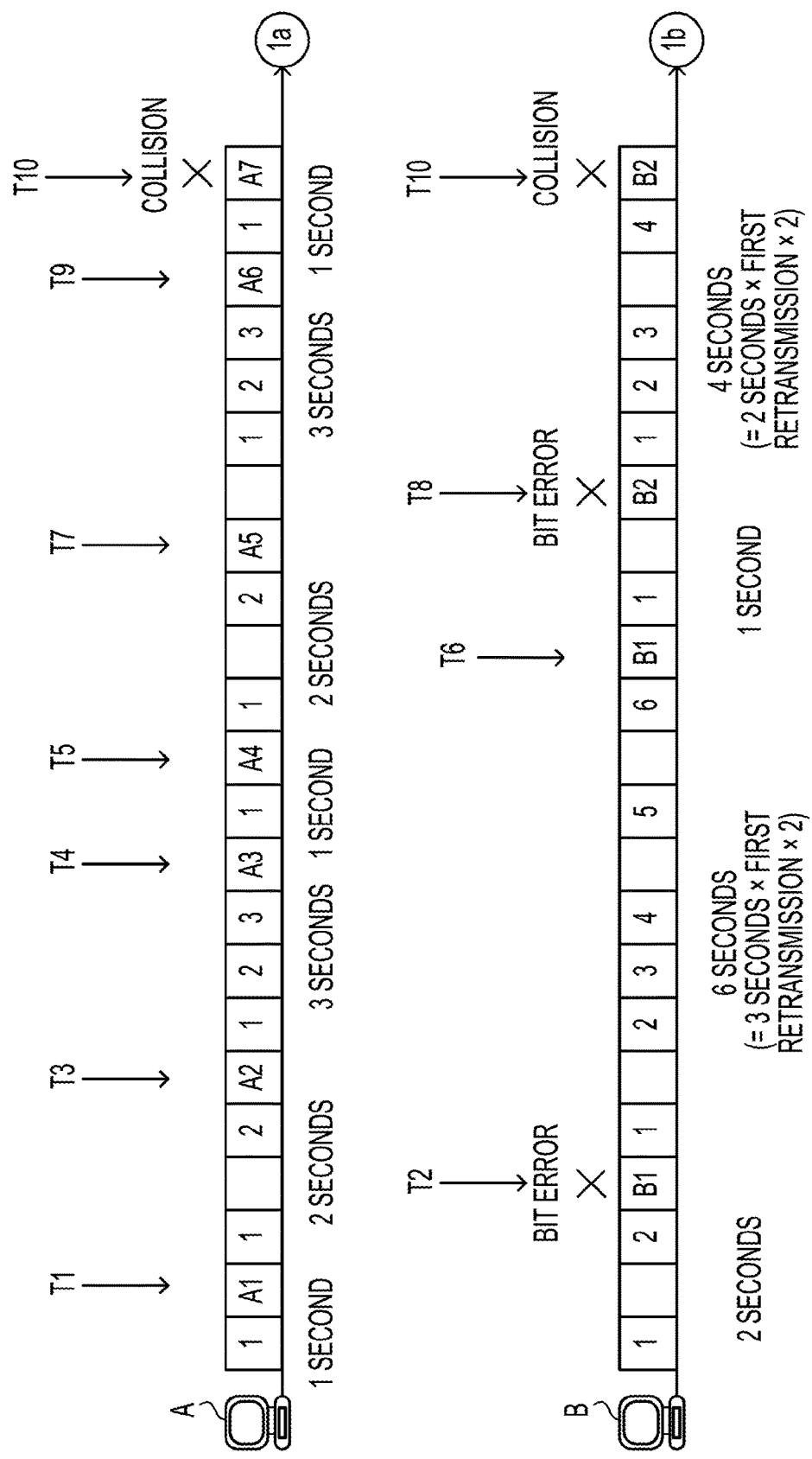
FIG. 5 is a diagram illustrating an example of a situation in which packets of packet groups of two wireless LAN terminals connected to the same AP do not appear alternately.
Figure 6:
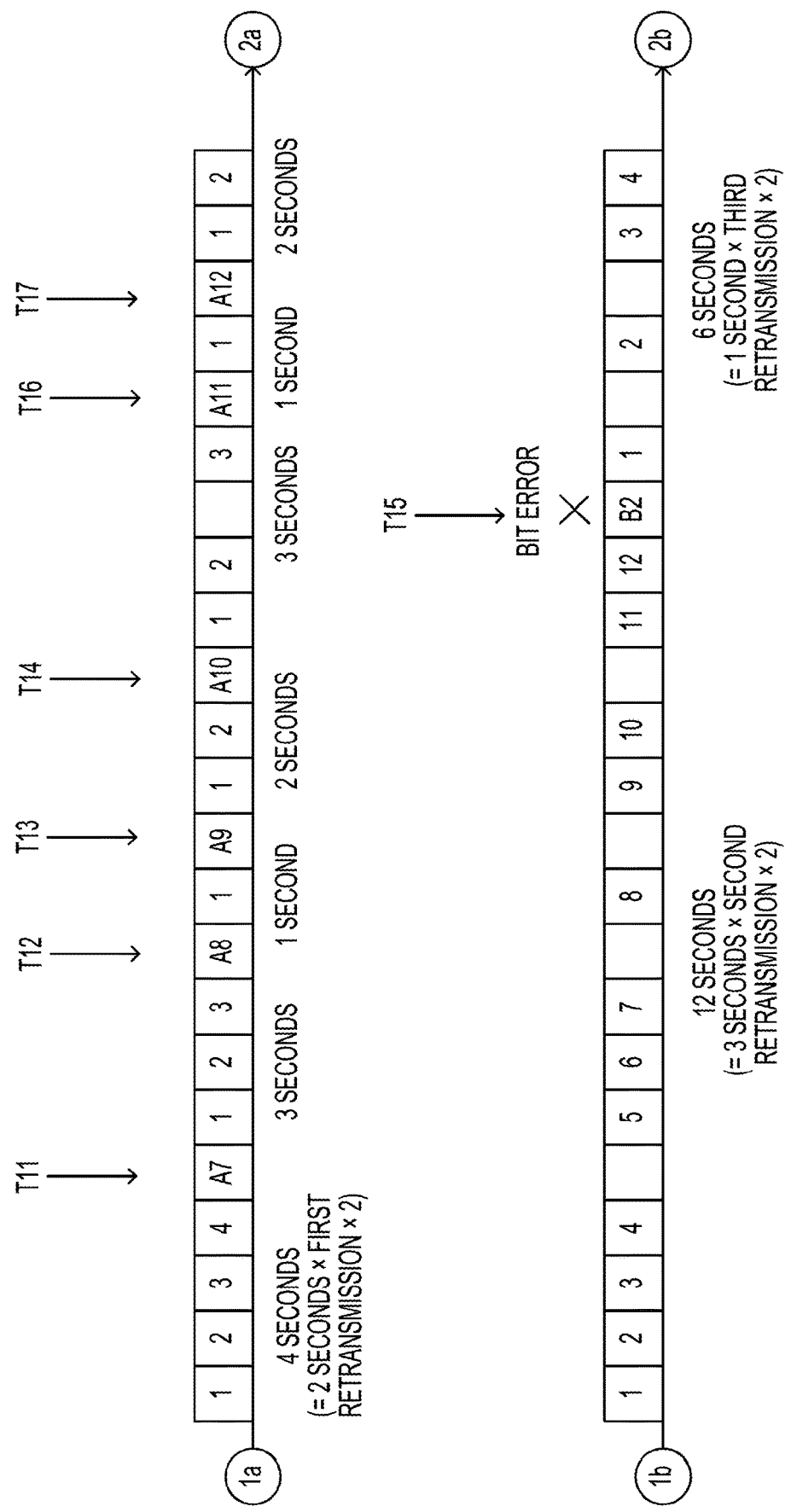
FIG. 6 is a diagram illustrating an example of a situation in which packets of packet groups of two wireless LAN terminals connected to the same AP do not appear alternately.
Figure 7:
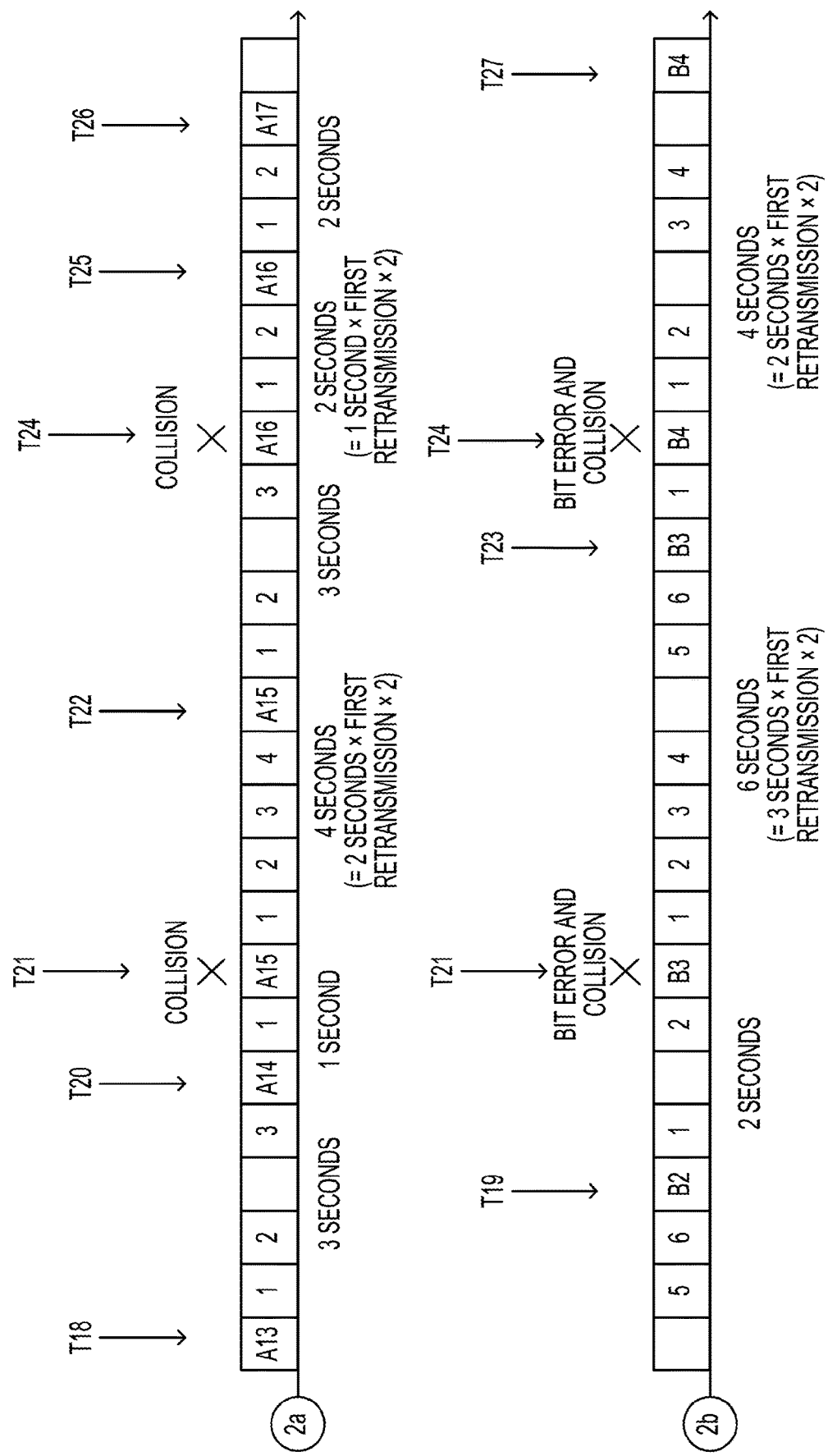
FIG. 7 is a diagram illustrating an example of a situation in which packets of packet groups of two wireless LAN terminals connected to the same AP do not appear alternately.

FIGS. 5 to 7 are diagrams illustrating an example of a situation in which packets of packet groups of two wireless LAN terminals connected to the same AP do not appear alternately. In the figures, the symbol "An" refers to a packet transmitted by the wireless LAN terminal A and the symbol "Bn" refers to a packet transmitted by the wireless LAN terminal B (n=1, 2, 3, ... ). The integer values in the figures indicate the back-off time.

In addition, in order to make the description easy to understand, it is assumed that the wireless LAN terminals A and B operate under the following conditions (1) to (6).

(1) The frame transmission time of the wireless LAN terminals A and B is 1 second.

(2) The average back-off time of the wireless LAN terminals A and B is 2 seconds (the actual back-off time is in p seconds).

(3) The cycle of the back-off time of the wireless LAN terminal A transits as follows: 1 second→2 seconds→3 seconds→1 second→2 seconds→3 seconds→ . . . (in fact, the transition occurs more randomly).

(4) The cycle of the back-off time of the wireless LAN terminal B transits as follows: 2 seconds→3 seconds→1 second→2 seconds→3 seconds→1 second→ . . . (in fact, the transition occurs more randomly).

(5) Since the signal strength of the wireless LAN terminal B is weaker than that of the wireless LAN terminal A, one out of two transmissions becomes a bit error.

(6) The wireless LAN terminals A and B set the back-off time at retransmission to (original back-off time)×(number of retransmissions)×2.

The operation will be described below.

[Time T1] The wireless LAN terminal A transmits a packet A1 one second after the back-off time and succeeds in transmitting the packet A1.

[Time T2] The wireless LAN terminal B transmits a packet B1 two seconds after the back-off time, but a bit error occurs at the time of reception on the AP3 side and the transmission of the packet B1 fails.

[Time T3] The wireless LAN terminal A transmits a packet A2 two seconds after the back-off time and succeeds in transmitting the packet A2.

[Time T4] The wireless LAN terminal A transmits a packet A3 three seconds after the back-off time and succeeds in transmitting the packet A3.

[Time T5] The wireless LAN terminal A transmits a packet A4 one second after the back-off time and succeeds in transmitting the packet A4.

[Time T6] When retransmitting the packet B1, the wireless LAN terminal B calculates the back-off time as 6 seconds (=3 seconds×first retransmission×2) since the original back-off time is 3 seconds and the retransmission is the first time. Then, the wireless LAN terminal B transmits the packet B1 six seconds after the back-off time and succeeds in transmitting the packet B1 at the first retransmission.

[Time T7] The wireless LAN terminal A transmits a packet A5 two seconds after the back-off time and succeeds in transmitting the packet A5.

[Time T8] The wireless LAN terminal B transmits a packet B2 one second after the back-off time, but a bit error occurs at the time of reception on the AP3 side and the transmission of the packet B2 fails.

[Time T9] The wireless LAN terminal A transmits a packet A6 three seconds after the back-off time and succeeds in transmitting the packet A6.

[Time T10] The wireless LAN terminal A transmits a packet A7 one second after the back-off time. When retransmitting the packet B2, since the original back-off time is 2 seconds and the retransmission is the first time, the wireless LAN terminal B calculates the back-off time as 4 seconds (=2 seconds×first retransmission×2) and then, transmits the packet B2 four seconds after the back-off time.

At this time, the packet A7 transmitted by the wireless LAN terminal A collides with the packet B2 transmitted by the wireless LAN terminal B. Therefore, the wireless LAN terminal A fails to transmit the packet A7, and the wireless LAN terminal B fails to transmit the packet B2.

[Time T11] When retransmitting the packet A7, the wireless LAN terminal A calculates the back-off time as 4 seconds (=2 seconds×first retransmission×2) since the original back-off time is 2 seconds and the retransmission is the first time. Then, the wireless LAN terminal A transmits the packet A7 four seconds after the back-off time and succeeds in the transmission of the packet A7 at the first retransmission.

[Time T12] The wireless LAN terminal A transmits a packet A8 three seconds after the back-off time and succeeds in transmitting the packet A8.

[Time T13] The wireless LAN terminal A transmits a packet A9 one second after the back-off time and succeeds in transmitting the packet A9.

[Time T14] The wireless LAN terminal A transmits a packet A10 two seconds after the back-off time and succeeds in transmitting the packet A10.

[Time T15] When retransmitting the packet B2, the wireless LAN terminal B calculates the back-off time as 12 seconds (=3 seconds×second retransmission×2) since the original back-off time is 3 seconds and the retransmission is the second time. Then, the wireless LAN terminal B transmits the packet B2 twelve seconds after the back-off time, but a bit error occurs at the time of reception on the AP3 side and the transmission of the packet B2 fails.

[Time T16] The wireless LAN terminal A transmits a packet A11 three seconds after the back-off time and succeeds in transmitting the packet A11.

[Time T17] The wireless LAN terminal A transmits a packet A12 one second after the back-off time, and succeeds in transmitting the packet A12.

[Time T18] The wireless LAN terminal A transmits a packet A13 two seconds after the back-off time, and succeeds in transmitting the packet A13.

[Time T19] When retransmitting the packet B2, the wireless LAN terminal B calculates the back-off time as 6 seconds (=1 second×third retransmission×2) since the original back-off time is 1 second and the retransmission is the third time. Then, the wireless LAN terminal B transmits the packet B2 six seconds after the back-off time and succeeds in transmitting the packet B2.

[Time T20] The wireless LAN terminal A transmits a packet A14 three seconds after the back-off time and succeeds in transmitting the packet A14.

[Time T21] The wireless LAN terminal A transmits a packet A15 one second after the back-off time. The wireless LAN terminal B transmits a packet B3 two seconds after the back-off time.

At this time, the packet A15 transmitted by the wireless LAN terminal A collides with a packet B3 transmitted by the wireless LAN terminal B, and a bit error occurs on the AP3 side when the packet B3 is received. Therefore, the wireless LAN terminal A fails to transmit a packet A15, and the wireless LAN terminal B fails to transmit the packet B3.

[Time T22] When retransmitting the packet A15, the wireless LAN terminal A calculates the back-off time as 4 seconds (=2 seconds×first retransmission×2) since the original back-off time is 2 seconds and the retransmission is the first time. Then, the wireless LAN terminal A transmits the packet A15 four seconds after the back-off time and succeeds in transmitting the packet A15.

[Time T23] When retransmitting the packet B3, the wireless LAN terminal B calculates the back-off time as 6 seconds (=3 seconds×first retransmission×2) since the original back-off time is 3 seconds and the retransmission is the first time. Then, the wireless LAN terminal B transmits the packet B3 six seconds after the back-off time and succeeds in transmitting the packet B3.

[Time T24] The wireless LAN terminal A transmits a packet A16 three seconds after the back-off time. The wireless LAN terminal B transmits a packet B4 one second after the back-off time.

At this time, the packet A16 transmitted by the wireless LAN terminal A collides with the packet B4 transmitted by the wireless LAN terminal B, and a bit error occurs on the AP3 side when the packet B4 is received. Therefore, the wireless LAN terminal A fails to transmit the packet A16, and the wireless LAN terminal B fails to transmit the packet B4.

[Time T25] When retransmitting the packet A16, the wireless LAN terminal A calculates the back-off time as 2 seconds (=1 second×first retransmission×2) since the original back-off time is 1 second and the retransmission is the first time. Then, the wireless LAN terminal A transmits the packet A16 two seconds after the back-off time and succeeds in transmitting the packet A16.

[Time T26] The wireless LAN terminal A transmits a packet A17 two seconds after the back-off time, and succeeds in transmitting the packet A17.

[Time T27] When retransmitting the packet B4, the wireless LAN terminal B calculates the back-off time as 4 seconds (=2 seconds×first retransmission×2) since the original back-off time is 2 seconds and the retransmission is the first time. Then, the wireless LAN terminal B transmits the packet B4 four seconds after the back-off time and succeeds in transmitting the packet B4.

Figure 8:
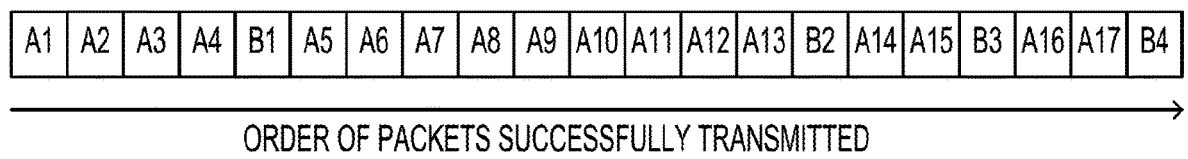
FIG. 8 is a diagram illustrating the order of packets successfully transmitted.

FIG. 8 is a diagram illustrating the order of packets successfully transmitted. FIG. 8 illustrates the order in which the packets successfully transmitted are accumulated when the packet transmission is performed in the operation flow as described above. The packet A1, . . . , A4, the packet B1, the packet A5, . . . , A13, the packet B2, the packet A14, A15, the packet B3, the packet A16, A17, and the packet B4 are accumulated in the order of arrival of the packets.

Here, a phenomenon called a capture effect occurs in which the wireless LAN terminal A having a strong received signal strength has an increasing possibility of succeeding in packet transmission than the wireless LAN terminal B having a weak received signal strength.

Also, in the above-described example, there is a high possibility that packets from the wireless LAN terminal A close to the AP3 (i.e., having the large reception power) are normally received. Further, for packets from the wireless LAN terminal B far from the AP3 (i.e., having the small reception power), bit errors occur or a continuous retransmission occurs, so that a fair throughput may not be obtained between the wireless LAN terminals.

Therefore, there is a high possibility that packets of two wireless LAN terminals A and B connected to the same AP3 do not appear alternately, and in the two packet flows, it may be seen that the frequency of the consecutive number of packets appearing alternately and consecutively one packet at a time is equal to or less than a predetermined value.

Second Embodiment

Next, a second embodiment will be described. In the second embodiment, a packet capturing is performed in a wired section of a system in which a wireless LAN is constructed, and it is determined whether a plurality of wireless LAN terminals are connected to the same AP based on the consecutive number of different packets appearing alternately and consecutively among packet groups.

<System Configuration>

Figure 9:
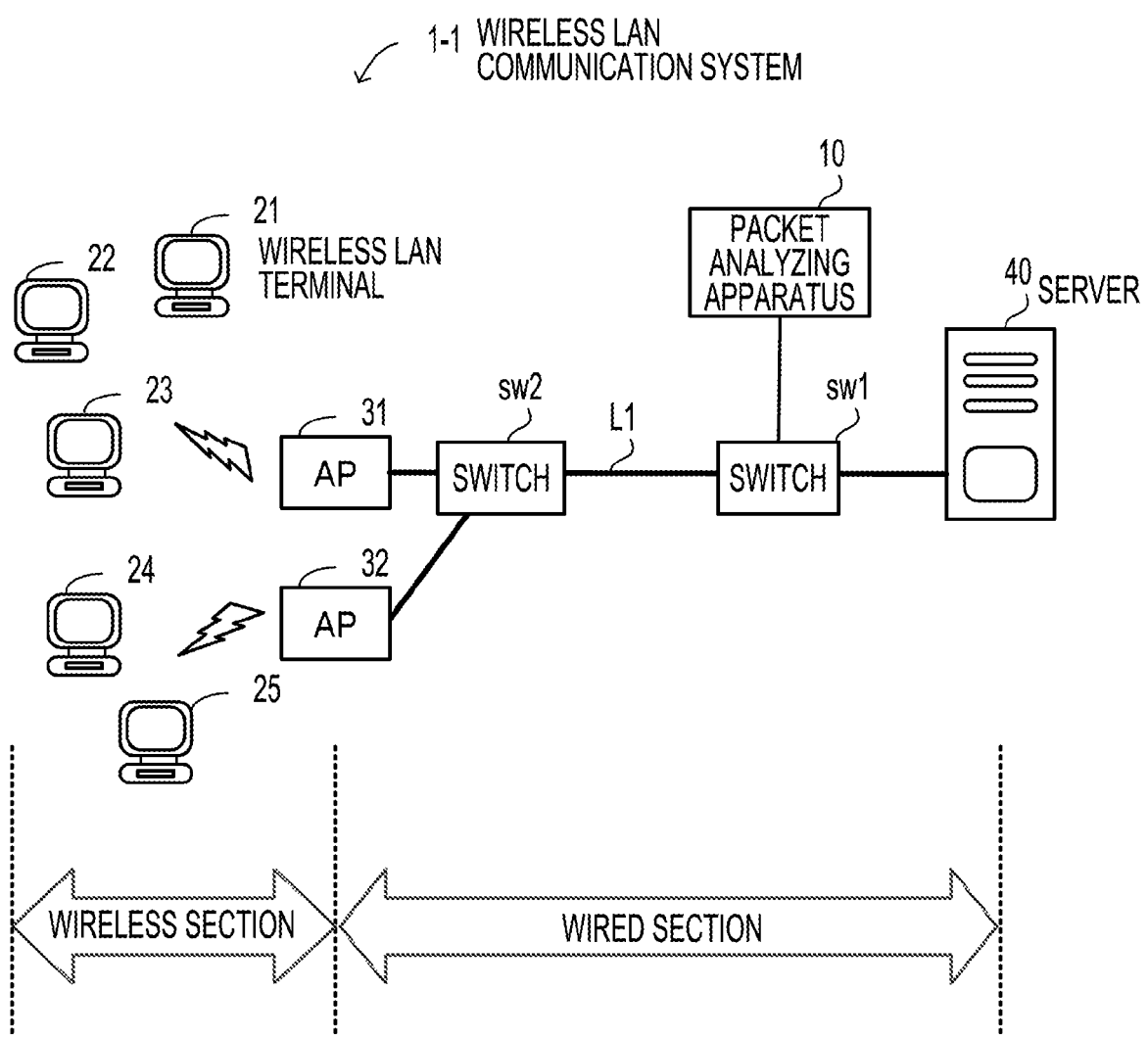
FIG. 9 is a diagram illustrating a configuration example of a wireless LAN communication system.

FIG. 9 is a diagram illustrating a configuration example of a wireless LAN communication system. A wireless LAN communication system 1-1 includes wireless LAN terminals 21, . . . , 25, APs 31 and 32, a packet analyzing apparatus 10, and a server 40. Further, the communication section of the wireless LAN communication system 1-1 may be divided into a wired section and a wireless section.

In the wired section, the server 40 is located at the end of a wired line L1, and switches sw1 and sw2, which are branching devices, are provided on the wired line L1. Then, the packet analyzing apparatus 10 is connected to the wired line L1 via the switch sw1 (or a tap), and the APs 31 and 32 are connected to the wired line L1 via the switch sw2.

Further, in the example of FIG. 9, the wireless LAN terminals 21, . . . , 23 are connected to the AP31 in the wireless section, and the wireless LAN terminals 24 and 25 are connected to the AP32 in the wireless section.

The packet analyzing apparatus 10 analyzes the communication state of the wireless LAN and manages the communication quality of the wireless LAN. In this case, the packet analyzing apparatus 10 performs a packet capturing in the wired section in the system, that is, acquires the packet flowing through the wired line L1 via the switch sw1, and analyzes the communication state of the wireless LAN.

<Analysis Result of Communication State>

Figure 10:
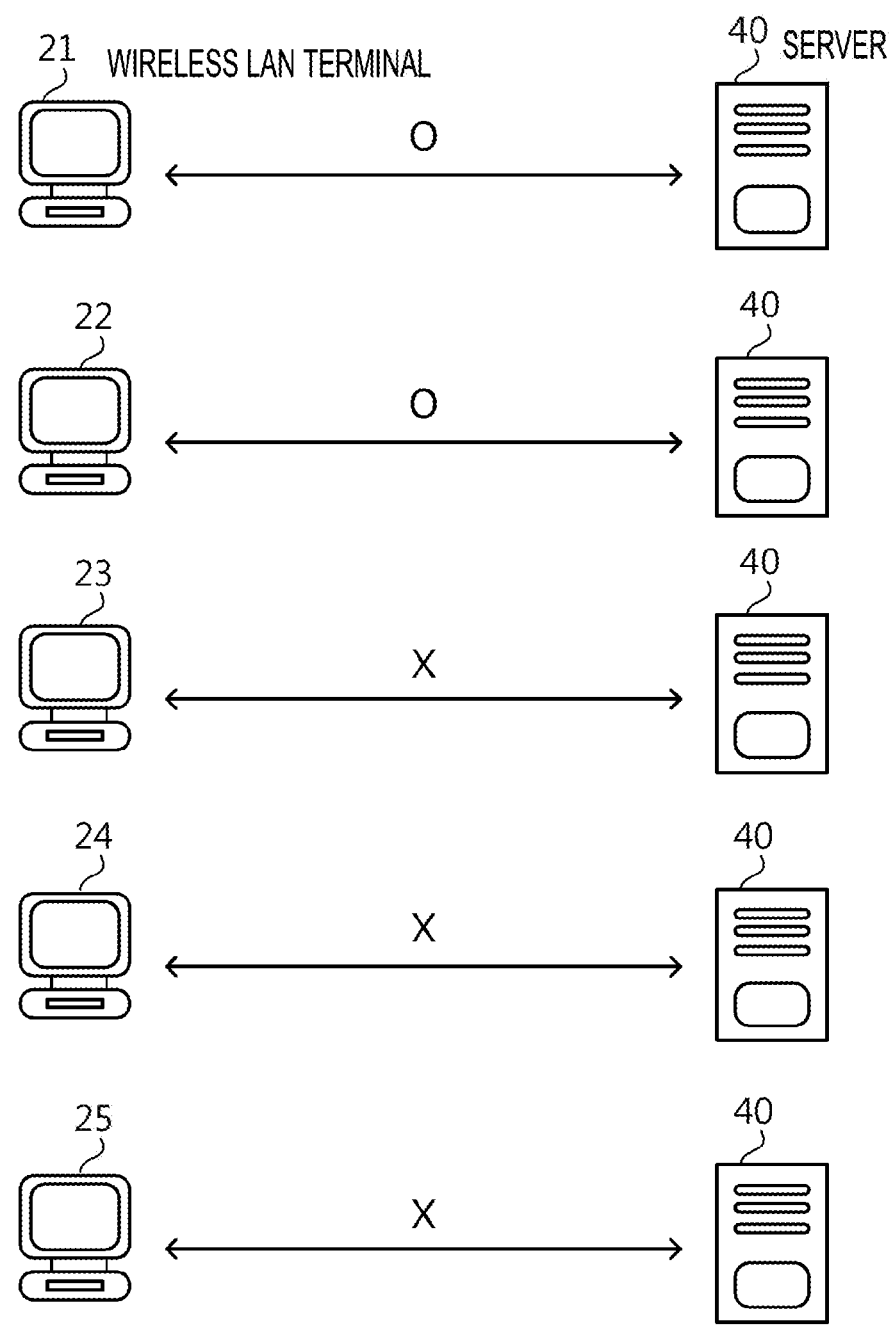
FIG. 10 is a diagram illustrating an example of an analysis result of a communication state.

FIG. 10 is a diagram illustrating an example of an analysis result of a communication state. The packet analyzing apparatus 10 may analyze the communication state between the wireless LAN terminals 21, . . . , 25 and the server 40 by a packet capturing in the wired section.

In the example of FIG. 10, the packet analyzing apparatus 10 recognizes that the communication quality between the wireless LAN terminal 21 and the server 40 is good, and that the communication quality between the wireless LAN terminal 22 and the server 40 is good.

In addition, the packet analyzing apparatus 10 recognizes that the communication quality between the wireless LAN terminal 23 and the server 40 is in a deteriorated state, the communication quality between the wireless LAN terminal 24 and the server 40 is in a deteriorated state, and the communication quality between the wireless LAN terminal 25 and the server 40 is in a deteriorated state.

Here, the packets flowing through the wired line L1 do not include information on which AP the wireless LAN terminal is connected to. For this reason, in the related art, it is difficult to analyze the communication state in units of AP between the wireless LAN terminal and the AP.

Therefore, as illustrated in the example of FIG. 10, even when deterioration in communication quality between the wireless LAN terminal and the server is detected, it is difficult to distinguish whether the cause of deterioration in communication quality is the wireless LAN terminal or the AP.

Further, it is conceivable that the packet analyzing apparatus acquires the communication information between the wireless LAN terminal and the AP from the AP, and analyzes the communication state of the wireless LAN. However, in order to acquire the communication information from the AP, it is necessary to ask the administrator of the AP, log in to each AP to issue a command, etc., so that the communication information may not be easily acquired.

Therefore, in the second embodiment, a packet group is acquired in a wired section of a system in which a wireless LAN is constructed, and it is determined whether a plurality of wireless LAN terminals are connected to the same AP based on the consecutive number of different packets appearing alternately among packet groups.

As a result, when deterioration in communication quality is recognized, it is possible to distinguish whether the cause of deterioration exists on the wireless LAN terminal side or on the AP side, as deterioration points of communication quality.

<Hardware Configuration>

Figure 11:
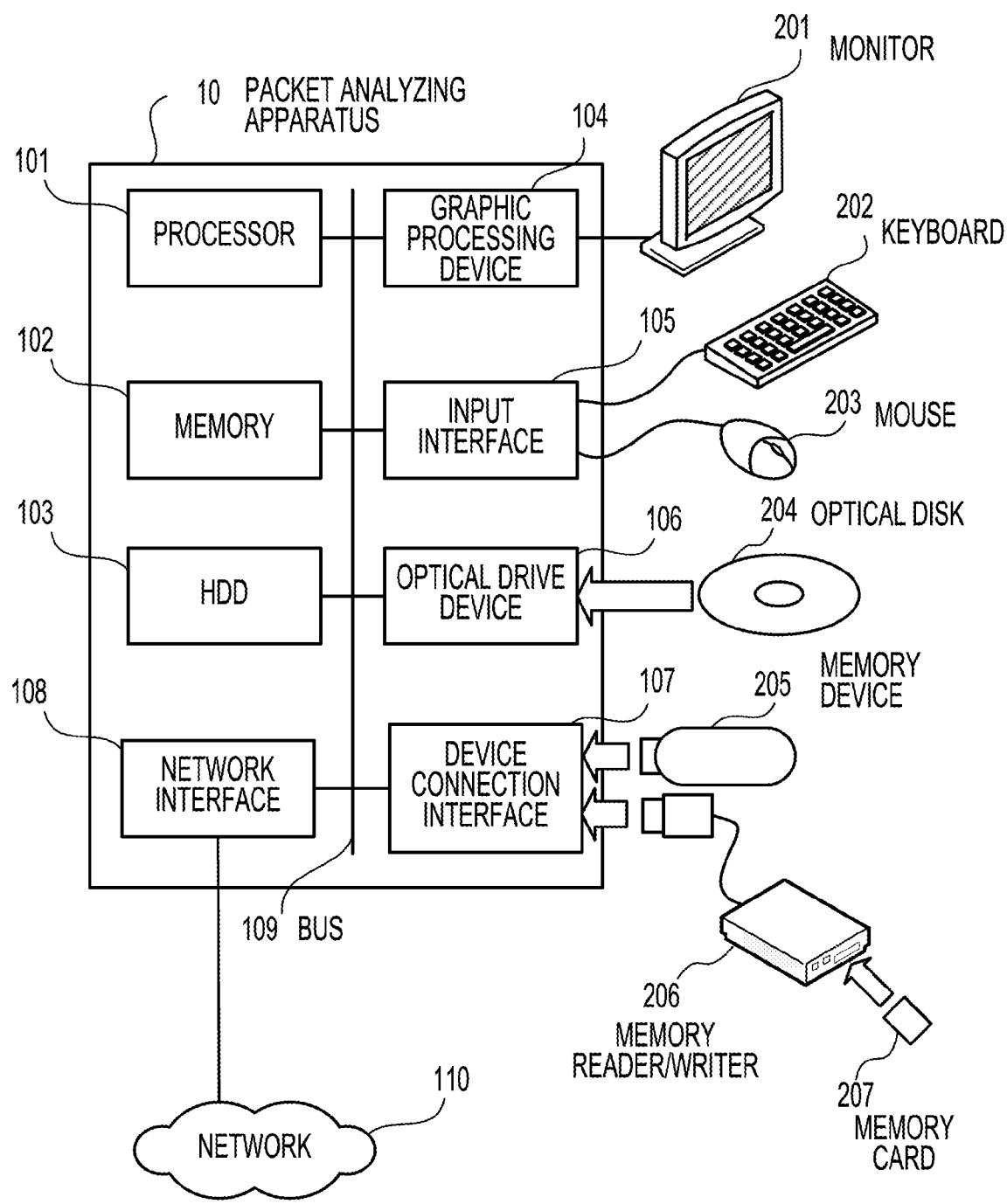
FIG. 11 is a diagram illustrating a configuration example of hardware of a packet analyzing apparatus used in a second embodiment.

FIG. 11 is a diagram illustrating a configuration example of hardware of a packet analyzing apparatus used in a second embodiment. In the packet analyzing apparatus 10, the entire apparatus is controlled by a processor 101. A memory 102 and a plurality of peripheral devices are connected to the processor 101 via a bus 109. The processor 101 may be a multiprocessor.

The processor 101 is, for example, a central processing unit (CPU), a micro processing unit (MPU), or a digital signal processor (DSP). At least a part of the functions of the processor 101 may be implemented by electronic circuits such as, for example, an application specific integrated circuit (ASIC) and a programmable logic device (PLD).

The memory 102 is used as a main storage device of the packet analyzing apparatus 10. At least a part of an operating system (OS) program to be executed by the processor 101 and an application program is temporarily stored in the memory 102. Further, various data necessary for processing by the processor 101 are stored in the memory 102. As for the memory 102, for example, a volatile semiconductor memory device such as, for example, a random access memory (RAM) is used.

Examples of peripheral devices connected to a bus 109 include a hard disk drive (HDD) 103, a graphic processing device 104, an input interface 105, an optical drive device 106, a device connection interface 107, and a network interface 108.

The HDD 103 magnetically writes and reads data to and from a built-in disk. The HDD 103 is used as an auxiliary storage device of the packet analyzing apparatus 10. The HDD 103 stores OS programs, application programs, and various data. As for the auxiliary storage device, a nonvolatile semiconductor storage device such as, for example, a flash memory may also be used.

A monitor 201 is connected to the graphic processing device 104. The graphic processing device 104 displays an image on the screen of the monitor 201 according to an instruction from the processor 101. As for the monitor 201, a display device using a cathode ray tube (CRT), a liquid crystal display device, or the like may be used.

A keyboard 202 and a mouse 203 are connected to the input interface 105. The input interface 105 transmits a signal sent from the keyboard 202 and the mouse 203 to the processor 101.

In addition, the mouse 203 is an example of a pointing device, and other pointing devices may be used. Other pointing devices include a touch panel, a tablet, a touch pad, a track ball, and the like.

The optical drive device 106 reads data recorded on the optical disk 204 by using laser light or the like. The optical disk 204 is a portable recording medium on which data is recorded so as to be readable by reflection of light. As for the optical disc 204, a digital versatile disc (DVD), a DVD-RAM, a compact disc read only memory (CD-ROM), a CD-R (recordable)/RW (rewritable) or the like may be used.

The device connection interface 107 is a communication interface that connects peripheral devices to the packet analyzing apparatus 10. For example, a memory device 205 and a memory reader/writer 206 may be connected to the device connection interface 107. The memory device 205 is a recording medium that has a communication function with the device connection interface 107. The memory reader/writer 206 is a device that writes data to a memory card 207 or reads data from the memory card 207. The memory card 207 is a card type recording medium.

The network interface 108 is connected to a network 110 (including a wireless LAN). The network interface 108 exchanges data with another computer or a communication device via the network 110.

With the hardware configuration as described above, the processing function of the second embodiment may be implemented. Further, the packet analyzing apparatus 1 illustrated in the first embodiment may also be implemented by the same hardware as the packet analyzing apparatus 10 illustrated in FIG. 11.

The packet analyzing apparatus 10 implements the processing function of the second embodiment by executing a program recorded on, for example, a computer readable recording medium. A program that describes processing contents to be executed by the packet analyzing apparatus 10 may be recorded in various recording media.

For example, a program to be executed by the packet analyzing apparatus 10 may be stored in the HDD 103. The processor 101 loads at least a part of the program in the HDD 103 into the memory 102 and executes the program. Further, a program to be executed by the packet analyzing apparatus 10 may be recorded in a portable recording medium such as, for example, the optical disk 204, the memory device 205, and the memory card 207.

The program stored in the portable recording medium may be executed after being installed in the HDD 103, for example, under the control of the processor 101. Further, the processor 101 may read and execute the program directly from the portable recording medium.

<Function Block>

Figure 12:
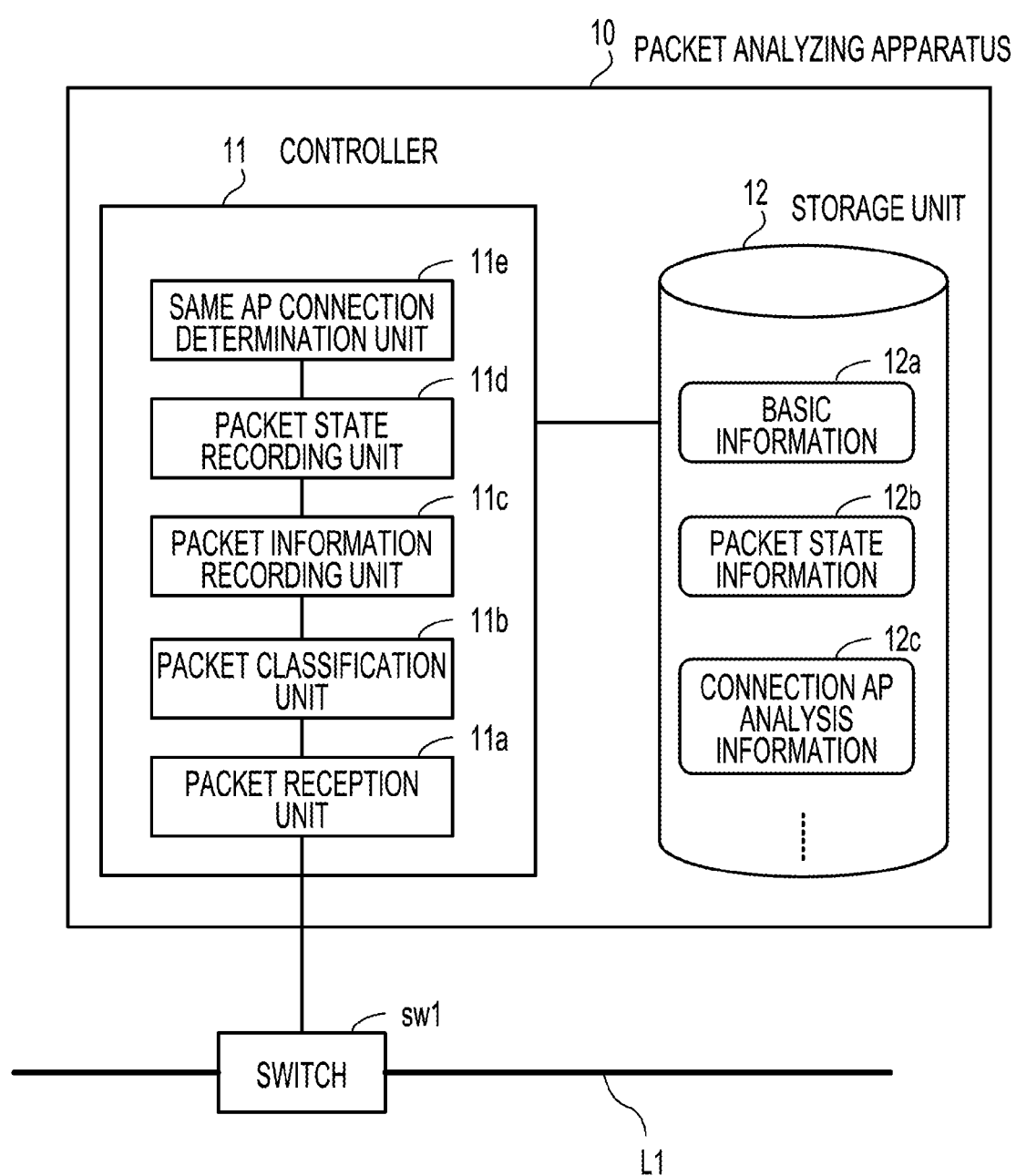
FIG. 12 is a block diagram illustrating an example of a function of the packet analyzing apparatus used in the second embodiment.

FIG. 12 is a block diagram illustrating an example of a function of the packet analyzing apparatus used in the second embodiment. The packet analyzing apparatus 10 includes a controller 11 and a storage unit 12. The controller 11 includes a packet reception unit 11a, a packet classification unit 11b, a packet information recording unit 11c, a packet state recording unit 11d, and a same AP connection determination unit 11e.

The functions of these constituent units are executed by the processor 101 illustrated in FIG. 11, and the storage unit 12 corresponds to the memory 102 and the HDD 103 illustrated in FIG. 11. The respective constituent units may be constituted by a hardware circuit by a logic circuit or the like. Further, the function of the controller 1a illustrated in FIG. 1 is implemented in the controller 11, and the function of the storage unit 1b illustrated in FIG. 1 is implemented in the storage unit 12.

The packet reception unit 11a receives the packets flowing through the wired line L1 via the switch sw1. Based on the header information of the received packets, the packet classification unit 11b classifies whether the received packets are packets of the transmission control protocol. The packet information recording unit 11c stores the transmission source IP (Internet protocol) address, etc. of the packets as basic information 12a in the storage unit 12.

The packet state recording unit 11d records the packet reception time, packet size, and the like in the storage unit 12 as packet state information 12*b*. The same AP connection determination unit 11*e* obtains the maximum value of the consecutive number of packets appearing alternately one packet at a time, determines whether the two wireless LAN terminals are connected to the same AP based on the consecutive number, and stores the determination result in the storage unit 12, as connection AP analysis information 12*c*.

The storage unit 12 stores the basic information 12*a*, the packet state information 12*b*, and the connection AP analysis information 12*c* as described above. In addition to these pieces of information, various parameters used in each constituent unit, information used for overall control of the packet analyzing apparatus 10, and the like are stored.

<Packet State Information and Connection AP Analysis Information>

FIG. 13 is a diagram illustrating an example of packet state information. The packet state information 12*b* has, as items, a reception time, a transmission source IP address, and a packet size. Further, the packet size corresponds to the size of the TCP payload (to be described later in FIG. 20).

FIG. 14 is a diagram illustrating an example of connection AP analysis information. The connection AP analysis information 12*c* has, as items, the IP address of the wireless LAN terminal, the IP address of the wireless LAN terminal to be compared, and the ratio. The ratio is a rate at which the maximum value of the consecutive number of packets appearing alternately one packet at a time becomes equal to or greater than a predetermined value (e.g., 3).

<Analysis Period and Same AP Determination Period>

The controller 11 of the packet analyzing apparatus 10 captures the packets transmitted by the wireless LAN terminal in the wired section and obtains the consecutive number of packets appearing alternately one packet at a time for each of the two wireless LAN terminals simultaneously communicating. Then, the controller 11 determines whether the two wireless LAN terminals are connected to the same AP based on the consecutive number. In the case of performing such an identity determination processing, the controller 11 sets the analysis period (first period) and the same AP determination period (second period) for the captured packet flow.

Figure 15:
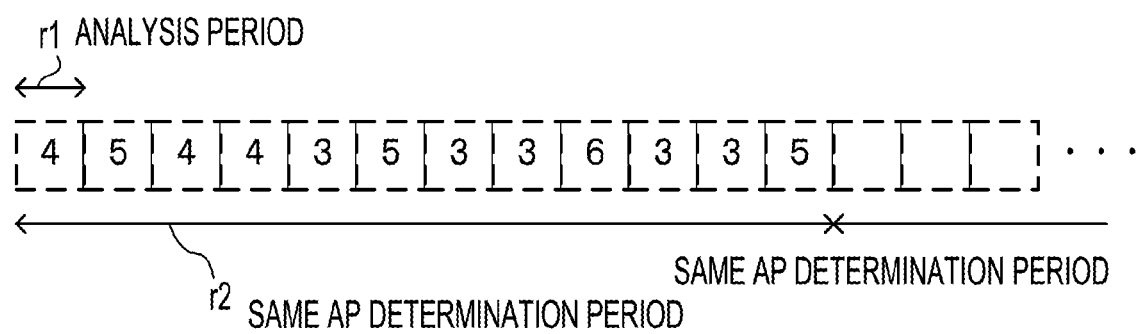
FIG. 15 is a diagram illustrating an example of an analysis period and a same AP determination period.

FIG. 15 is a diagram illustrating an example of an analysis period and an identical AP determination period. The controller 11 sets an analysis period r1 (e.g., 100 ms) to calculate the maximum value of the consecutive number of packets appearing alternately one packet at a time. Numerical values in FIG. 15 indicate maximum values of the consecutive number of packets appearing alternately one packet at a time. For example, reference numeral "4" in the analysis period r1 indicates that the maximum value of the consecutive number of packets appearing alternately one packet at a time in the period is 4.

Further, the controller 11 sets a same AP determination period r2 (e.g., 1 minute) to determine whether the two wireless LAN terminals are connected to the same AP. The same AP determination period r2 is an integral multiple of the analysis period r1.

<Determination of Analysis Period>

When determining the analysis period, the communication rate is first determined. For example, the communication rate is assumed to be one tenth of the maximum rate of the wireless LAN system. Therefore, when the communication rate of the wireless LAN system is 144 Mbps, it is 14.4 Mbps. Also, it is assumed that the packet size is 1460 bytes and the number of packets to be analyzed is 100.

At this time, the analysis period is 1460 bytes×100÷14.4 Mbps=0.08 sec=80 ms. Since 1460 bytes and 14.4 Mbps are variable values, 80 ms also varies. Therefore, the controller 11 determines the analysis period to be 100 ms by giving the margin at 80 ms.

<Determination of Whether Analysis Period Is Analyzable>

Among the packets captured in analysis period units, packets transmitted from two wireless LAN terminals are subjected to the identity determination processing. In the analysis period, sufficient packets are transmitted from the two wireless LAN terminals to be subjected to the identity determination processing, and when the packet size is not large to a certain extent, the analysis period is not suitable as an analysis target.

Therefore, the controller 11 determines whether the analysis period is suitable as an analysis target. If the communication amount is somewhat large and the packet size is somewhat large within the analysis period, the analysis period is determined to be suitable as an analysis target, and if not, the analysis period is determined not to be suitable as an analysis period.

Specifically, when the rate of the packets transmitted from two wireless LAN terminals in the analysis period is less than a predetermined value (e.g., 14.4 Mbps), the analysis period is not regarded as an analysis target. As a simple example, assuming that the analysis period is 100 ms, when there is only one packet of wireless LAN terminal #1 and two packets of wireless LAN terminal #2 during 100 ms, it is obvious that the identity determination processing may not be performed. Therefore, in order to perform the identity determination processing, it is assumed that analysis is not performed when the rate of packets transmitted from two wireless LAN terminals in the analysis period is smaller than a predetermined value.

As another condition, when at least one of the two wireless LAN terminals does not have a connection which is communicating from the beginning to the end of the analysis period, it is determined that the analysis period is not an analysis target.

In other words, in both of the two wireless LAN terminals, when neither a SYN (packet at the time of connection establishment) nor a FIN (packet at the time of connection termination) is transmitted within the analysis period, the connection is established from the beginning to the end of the analysis period. Therefore, in this case, the analysis period becomes an analysis target.

Further, as another condition, when at least one of the two wireless LAN terminals is not a connection of MSS (maximum segment size), it is determined that the analysis period is not an analysis target.

<Determination of Same AP Determination Period>

The controller 11 determines a value which is equal to or greater than a value obtained by multiplying the analyzable analysis period by a predetermined value as the same AP determination period capable of the identity determination processing. For example, the controller 11 determines (analyzable analysis period)×(10 times or more) as the same AP determination period. In this case, the fact that the analysis period is 10 times is the determination availability condition of the same AP determination period.

<Identity Determination Processing>

The controller 11 performs the identity determination processing by comparing the rate at which the maximum value of the consecutive number becomes equal to or larger than the predetermined value with the threshold value. For example, when the rate at which the maximum value of the consecutive number is 3 or more is smaller than the threshold value, the controller 11 determines that the two wireless LAN terminals are connected to the same AP. Further, when the rate at which the maximum value of the consecutive number is 3 or more is greater than the threshold value, the controller 11 determines that the two wireless LAN terminals are connected to different APs.

In addition, two different threshold values may be set to perform the determination processing. For example, it is assumed that the two different threshold values are thresholds th1, th2, and the relationship between the threshold value th1 and threshold value th2 is "threshold value th2<the threshold value th1." In this case, when the rate at which the maximum value of the consecutive number becomes 3 or more is smaller than the threshold value th2, the controller 11 determines that the two wireless LAN terminals are connected to the same AP.

Further, when the rate at which the maximum value of the consecutive number is 3 or more is greater than the threshold value th1, the controller 11 determines that the two wireless LAN terminals are connected to different APs. By providing two threshold values in this manner, it is possible to detect with high accuracy the wireless LAN terminals connected to the same AP and the wireless LAN terminals connected to different APs.

Figure 16:
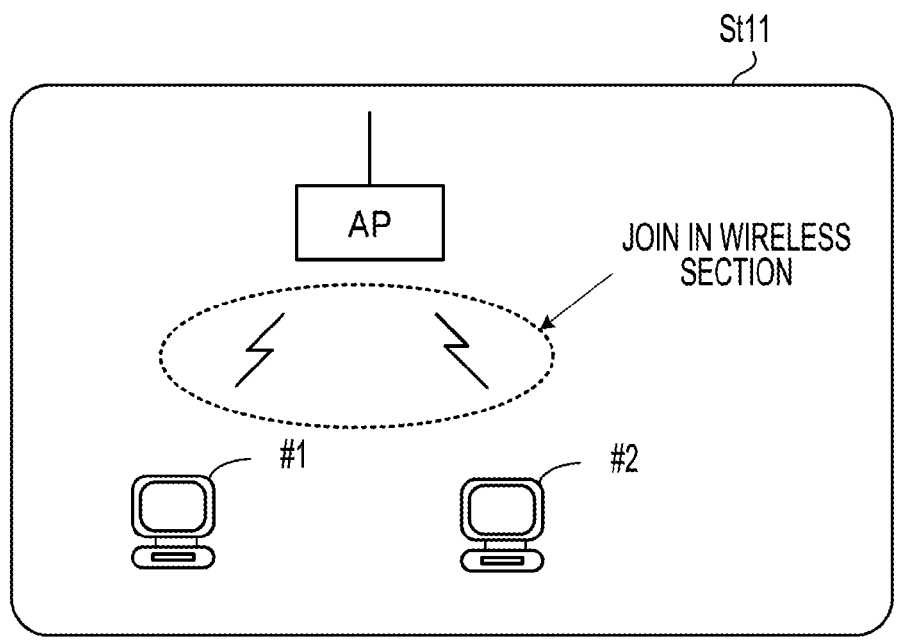
FIG. 16 is a diagram for explaining an example of an identity determination processing.
Figure 16:
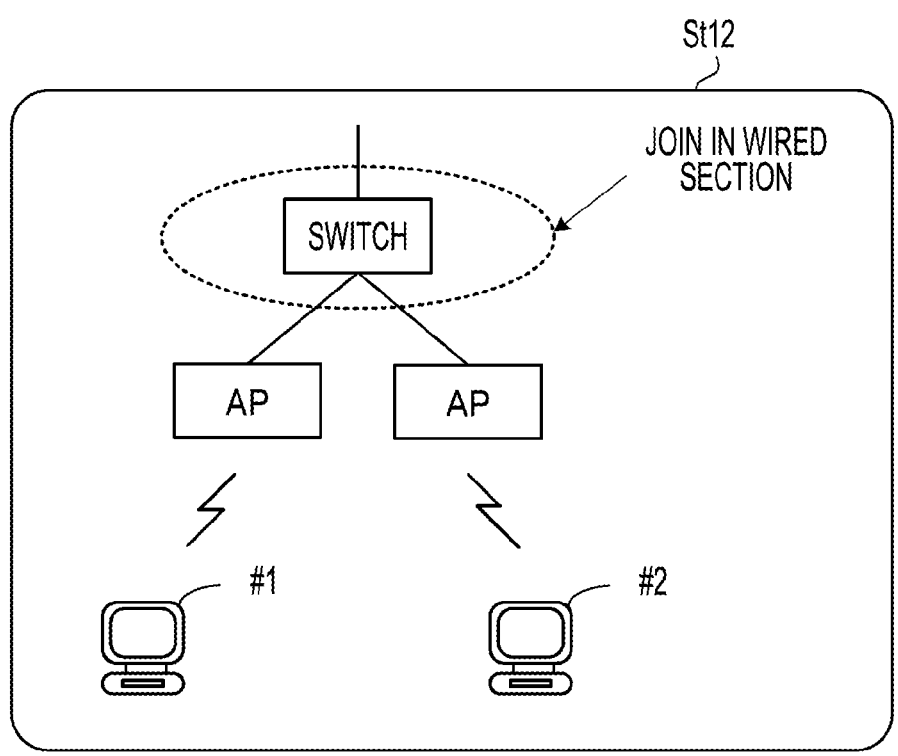

FIG. 16 is a diagram for explaining an example of the identity determination processing. It is assumed that the controller 11 performs the identity determination processing for the wireless LAN terminals #1 and #2.

The analysis period is 100 ms, and the same AP determination period is set to 2 seconds (=100 ms×20 times). Further, the threshold value th1 is set to 90%, and the threshold value th2 is set to 10%.

[State St11] The controller 11 measures the packet groups transmitted from the wireless LAN terminals #1 and #2, and it is assumed that there are 19 valid analysis periods and one maximum value of 3 or more of consecutive number in the same AP determination period of 2 seconds.

At this time, the ratio at which the maximum value of 3 or more of consecutive number appears is 5% ((1 time/19 times)×100), and the ratio 5% is smaller than 10% of the threshold value th2. When the ratio of the consecutive number of packets appearing alternately one packet at a time is smaller than the threshold value th2, there is a high possibility that the packets transmitted from the wireless LAN terminals #1 and #2 are joining in the wireless section, so that the wireless LAN terminals #1 and #2 are determined to be connected to the same AP.

[State St12] The controller 11 measures the packet groups transmitted from the wireless LAN terminals #1 and #2, and it is assumed that there are 20 valid analysis periods and 19 maximum values of 3 or more of consecutive number in the same AP determination period of 2 seconds.

At this time, the ratio at which the maximum value of 3 or more of consecutive number appears is 95% ((19 times/20 times)×100), and the ratio 95% is greater than 90% of the threshold value th1. When the ratio of the consecutive number of packets appearing alternately one packet at a time is greater than the threshold value th1, there is a high possibility that the packets transmitted from the wireless LAN terminals #1 and #2 are joining in the wired section, so that the wireless LAN terminals #1 and #2 are determined to be connected to mutually different APs.

<How to Count Consecutive Number>

Figure 17:
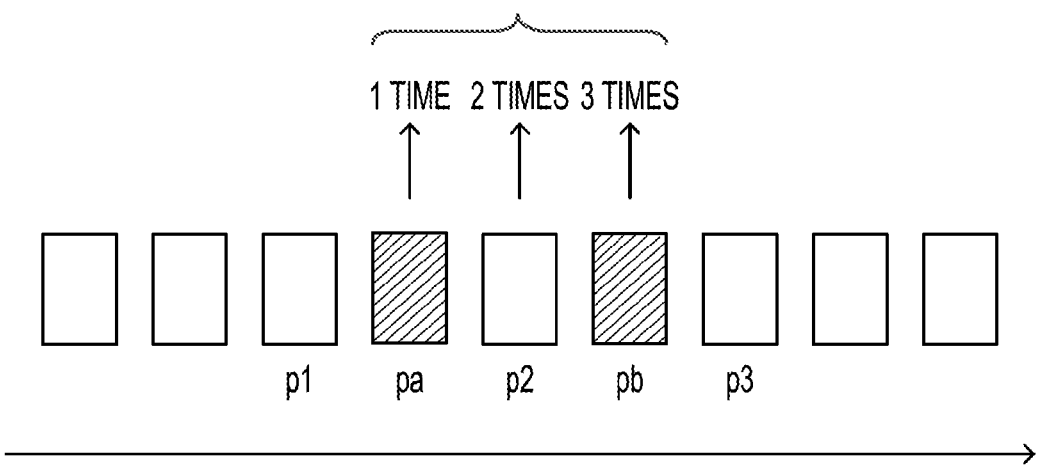
FIG. 17 is a diagram illustrating an example of a method of counting a consecutive number.

FIG. 17 is a diagram illustrating an example of a method of counting the consecutive number. The figure illustrates a method of counting the consecutive number when there are two wireless LAN terminals simultaneously communicating. It is assumed that the packets transmitted from the wireless LAN terminal #1 are white packets and the packets transmitted from the wireless LAN terminal #2 are hatched packets. Therefore, the packets p1, p2, and p3 are packets transmitted from the wireless LAN terminal #1, and the packets pa and pb are packets transmitted from the wireless LAN terminal #2.

The controller 11 counts the number of packets which are located on both sides of one packet and are different from the transmission source of the packet, and sets the count value as the consecutive number. That is, the counting is performed when the transmission source wireless LAN terminals of the packets on both sides of a certain packet are different from the transmission source wireless LAN terminal of the packet.

In the example of FIG. 17, packets p1 and p2 are located on both sides of packet pa, and packets p2 and p3 are located on both sides of packet pb. Therefore, the consecutive number of packets appearing alternately one packet at a time counts pa, p2, and pb and the consecutive number=3.

Figure 18:
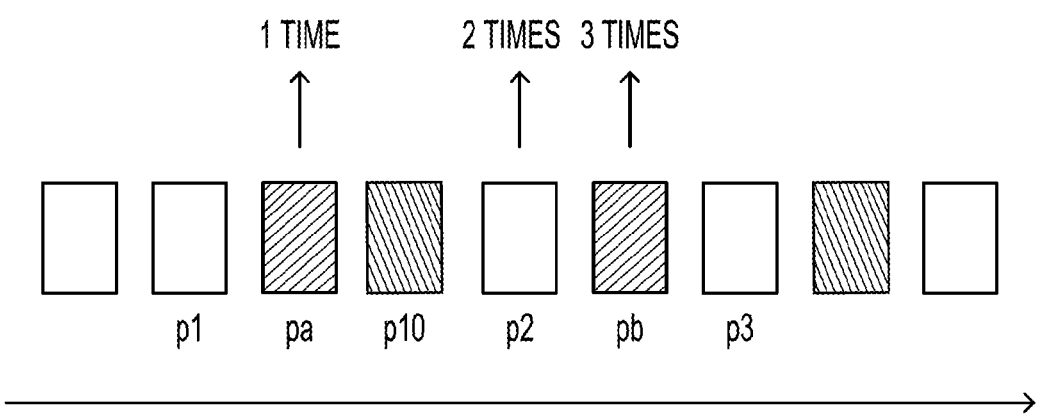
FIG. 18 is a diagram illustrating an example of a method of counting a consecutive number.

FIG. 18 is a diagram illustrating an example of a method of counting the consecutive number. The figure illustrates the method of counting the consecutive number when there are three wireless LAN terminals simultaneously communicating. It is assumed that the packets transmitted from the wireless LAN terminal #1 are white, the packets transmitted from the wireless LAN terminal #2 are upward hatched from left to right, and the packets transmitted from the wireless LAN terminal #3 are downward hatched from left to right. Therefore, the packets p1, p2, and p3 are packets transmitted from the wireless LAN terminal #1, the packets pa and pb are packets transmitted from the wireless LAN terminal #2, and packet p10 is the packet transmitted from the wireless LAN terminal #3.

Even when there are three or more wireless LAN terminals, the controller 11 performs the identity determination processing for two units. Thus, for example, when performing the identity determination processing of the wireless LAN terminals #1 and #2, the identity determination processing is performed temporarily excluding the packets transmitted from the wireless LAN terminal #3. That is, in the packets of the wireless LAN terminal #1 and the packets of the wireless LAN terminal #2, a counting is performed when the transmission source wireless LAN terminals of the packets on both sides of a certain packet are different from the transmission source wireless LAN terminal of the packet.

Therefore, excluding the packet p10, the same packet sequence as in FIG. 17 is arranged, so that the consecutive number of packets appearing alternately one packet at a time counts the packets pa, p2, and pb and the consecutive number=3.

Similarly, when performing the identity determination processing of the wireless LAN terminals #1 and #3, the packets transmitted from the wireless LAN terminal #2 are temporarily excluded and the identity determination processing is performed with the packets transmitted from the wireless LAN terminals #1 and #3.

Further, when performing the identity determination processing of the wireless LAN terminals #2 and #3, the packets transmitted from the wireless LAN terminal #1 are temporarily excluded and the identity determination processing is performed with the packets transmitted from each of the wireless LAN terminals #2 and #3.

<Flowchart>

Figure 19:
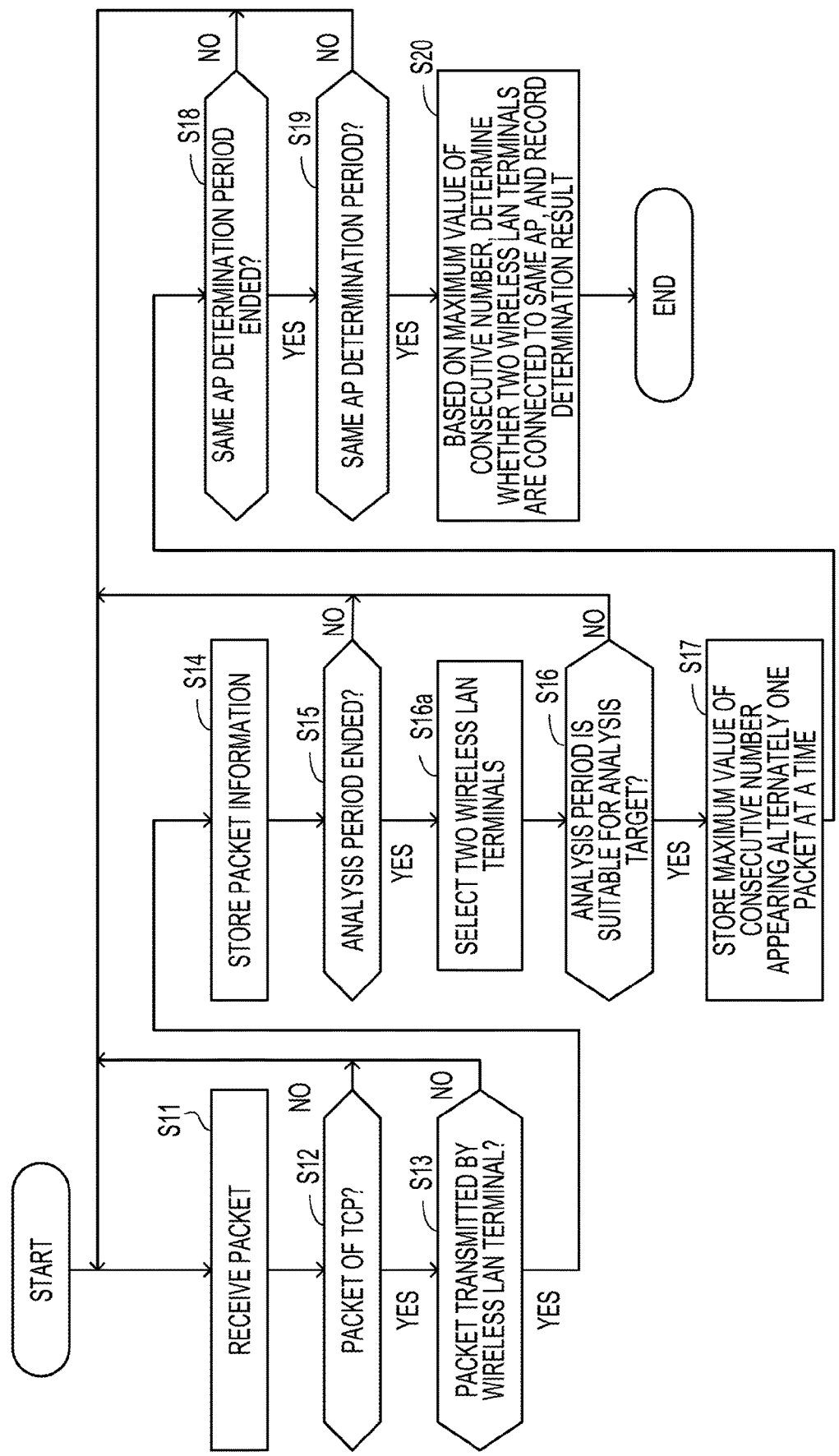
FIG. 19 is a flowchart illustrating an operation of a packet analyzing apparatus.

FIG. 19 is a flowchart illustrating an operation of a packet analyzing apparatus.

[Step S11] The controller 11 receives the packets flowing through the wired section via the switch (i.e., packet capturing).

[Step S12] Based on the header information of the packets, the controller 11 determines whether the received packets are TCP packets. In the case of TCP packets, the processing proceeds to step S13, and when the packets are not TCP packets, the processing returns to step S11.

[Step S13] The controller 11 determines whether the TCP packets after the packet classification process in step S12 are packets transmitted by the wireless LAN terminal. Specifically, when the transmission source IP address described in the IP header is the IP address of the wireless LAN terminal, the controller 11 recognizes the packets as packets transmitted by the wireless LAN terminal. In the case of the packets transmitted by the wireless LAN terminal, the processing proceeds to step S14, and when the packets are not the packets transmitted by the wireless LAN terminal, the processing returns to step S11.

[Step S14] The controller 11 stores packet information (a packet reception time, a packet size, etc.).

[Step S15] The controller 11 determines whether the predetermined analysis period has ended. When it is determined that the analysis period has ended, the processing proceeds to step S16a, and when the analysis period has not ended, the processing returns to step S11.

TCP packets transmitted from the wireless LAN terminal are captured during the analysis period. Assuming that the analysis period=100 ms, the processing proceeds to step S16 when 100 ms is reached, and the processing of steps S11, . . . , S15 is repeated until 100 ms is reached.

[Step S16a] The controller 11 selects two wireless LAN terminals to be subjected to the identity determination processing (i.e., a pair of wireless LAN terminals).

[Step S16] During the analysis period, the controller 11 determines whether the pair of the selected wireless LAN terminals is suitable as an analysis target based on the analysis availability condition. When it is determined that the analysis period is suitable as an analysis target, the processing proceeds to step S17, and when it is determined that the analysis period is not suitable, the processing returns to step S11.

[Step S17] With respect to the analysis period determined to be analyzable, the controller 11 calculates and stores the maximum value of the consecutive number of packets alternately appearing one packet at a time for each analysis period.

[Step S18] The controller 11 determines whether the predetermined AP determination period has ended. When it is determined that the same AP determination period has ended, the processing proceeds to step S19, and when it is determined that the same AP determination period has not ended, the processing returns to step S11.

[Step S19] The controller 11 determines whether the analysis period falls under the same AP determination period based on the predetermined determination availability condition of the same AP determination period. When it is determined that the analysis period falls under the same AP determination period, the processing proceeds to step S20, and when it is determined that the analysis period does not fall under the same AP determination period, the processing returns to step S11.

[Step S20] The controller 11 calculates the maximum value of the consecutive number of packets appearing alternately one packet at a time, determines whether the connection to the same AP is established, and records the determination result in the connection AP analysis information.

For example, the controller 11 determines that the connection to the same AP is established when the ratio of the maximum number of the consecutive number of packets appearing alternately one packet at a time is 3 or more is less than a predetermined value (e.g., less than 30%), and determines that the connection to different APs is established when such a ratio is equal to or greater than a predetermined value (e.g., 70% or more).

<Frame Structure>

Figure 20:
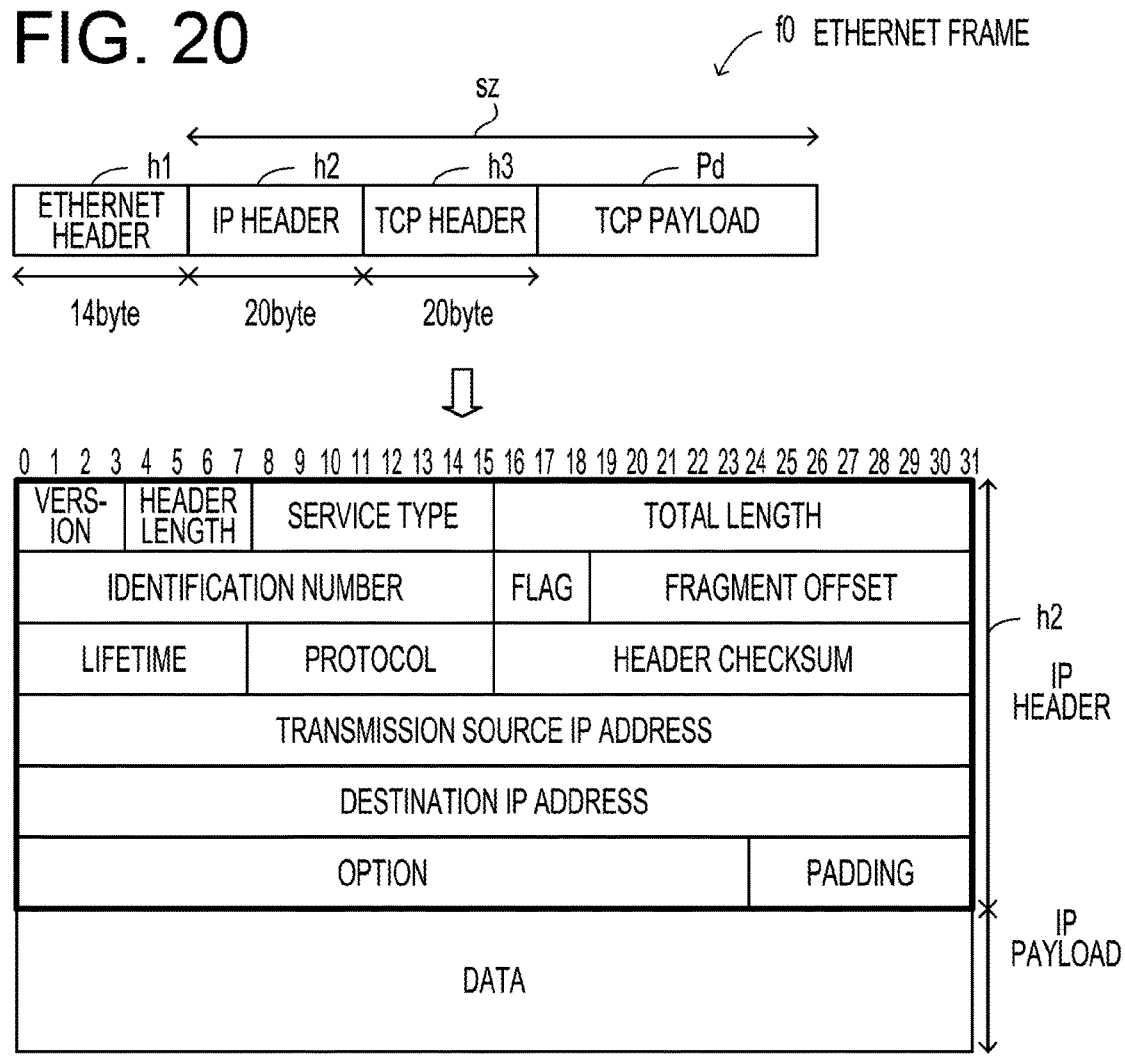
FIG. 20 is a diagram illustrating a structure when a frame transmitted from a wireless LAN terminal is captured in a wired section.
Figure 20:
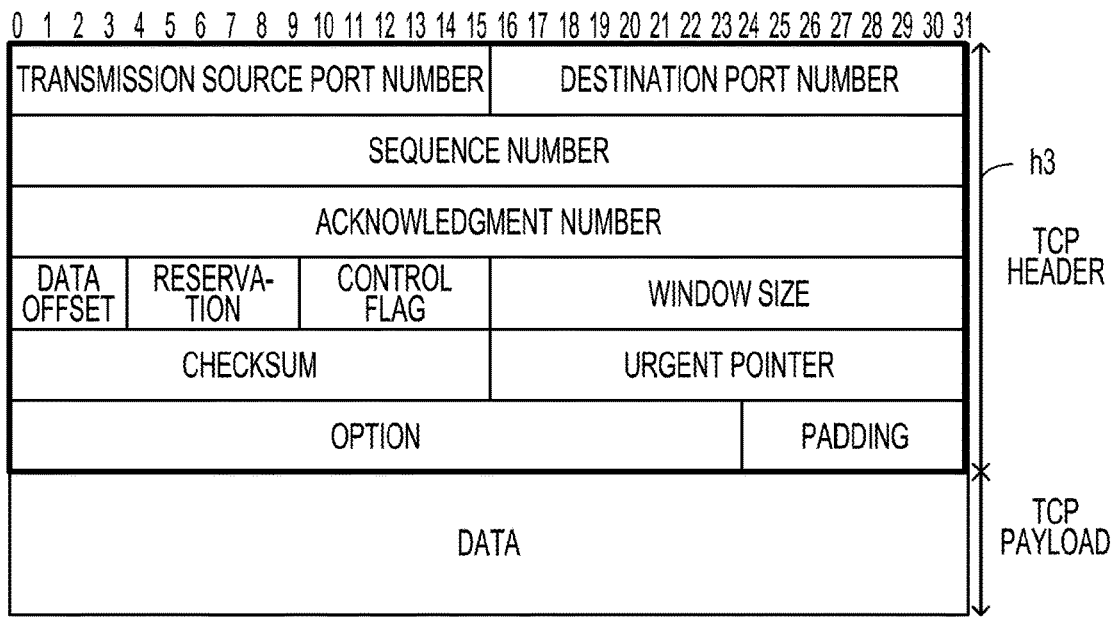

FIG. 20 is a diagram illustrating a structure when a frame transmitted from a wireless LAN terminal is captured in a wired section. Ethernet (this is a registered trademark, and the notation of a registered trademark is omitted herein) frame f0 has Ethernet header h1 (14 bytes), IP header h2 (20 bytes), TCP header h3 (20 bytes), and TCP payload Pd.

The IP header h2 includes respective fields of a version, a header length, a service type, a total length, an identification number, a flag, a fragment offset, a lifetime, a protocol, a header checksum, a transmission source IP address, a destination IP address, an option, and a padding.

The TCP header h3 includes a transmission source port number, a destination port number, a sequence number, an acknowledgment number, a data offset, a reservation, a control flag, a window size, a checksum, an urgent pointer, an option, and a padding.

Here, the packet size (TCP payload size) becomes a value obtained by subtracting 20 bytes of the IP header h2 and 20 bytes of the TCP header h3 from the total length sz in FIG. 20. Further, the total length sz is a value described in the "total length" field in the IP header h2. The packet size calculated in this manner is stored in the storage unit 12 as one item of the packet state information 12b as illustrated in FIG. 13.

Meanwhile, flags of 1 bit of URQ, ACK, PSH, RST, SYN, and FIN, respectively, (not illustrated) are provided in the "control flag" field in the TCP header h3. When the connection is established, the SYN flag is turned on, and when the connection is terminated, the FIN flag is turned on.

Therefore, based on the values of the SYN and FIN flags set in the control flag, the controller 11 may determine whether the connection is established within the analysis period.

<Output Result of Packet Analyzing Apparatus>

Figure 21:
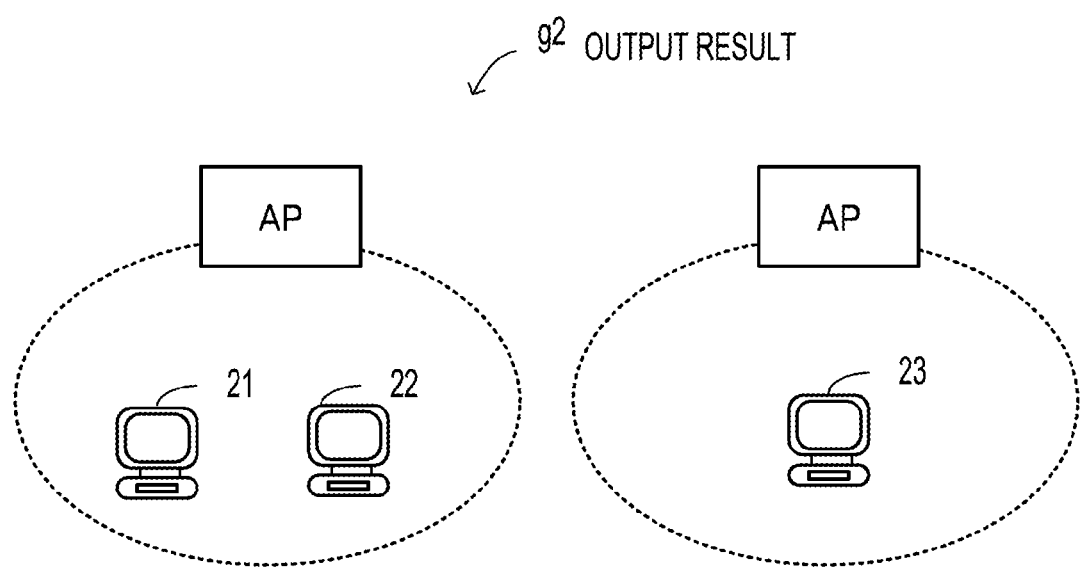
FIG. 21 is a diagram illustrating an example of an output result.

FIG. 21 is a diagram illustrating an example of an output result. The packet analyzing apparatus 10 displays the connection state between the wireless LAN terminal and the AP on the monitor 201 illustrated in FIG. 11, as an output result. It is assumed that the result is output and displayed that the wireless LAN terminals 21, 22 among the wireless LAN terminals 21, . . . , 23 are connected to the same AP.

An output result g1 is an example of displaying in table a state as to whether a plurality of wireless LAN terminals are connected to the same AP. In the output result g1, the symbol "○" is indicated in a common frame between the wireless LAN terminal 21 and the wireless LAN terminal 22. Further, the symbol "X" is indicated in the common frame between the wireless LAN terminal 21 and the wireless LAN terminal 23, and the common frame between the wireless LAN terminal 22 and the wireless LAN terminal 23.

An output result g2 is an example of illustrating and displaying the connection state between the wireless LAN terminal and the AP. It is represented that the wireless LAN terminal 21 and the wireless LAN terminal 22 are connected to the same AP and the wireless LAN terminal 23 is connected to another AP.

<Distinguishing Communication Quality Deteriorated Portion Based on Determination Result>

Figure 22:
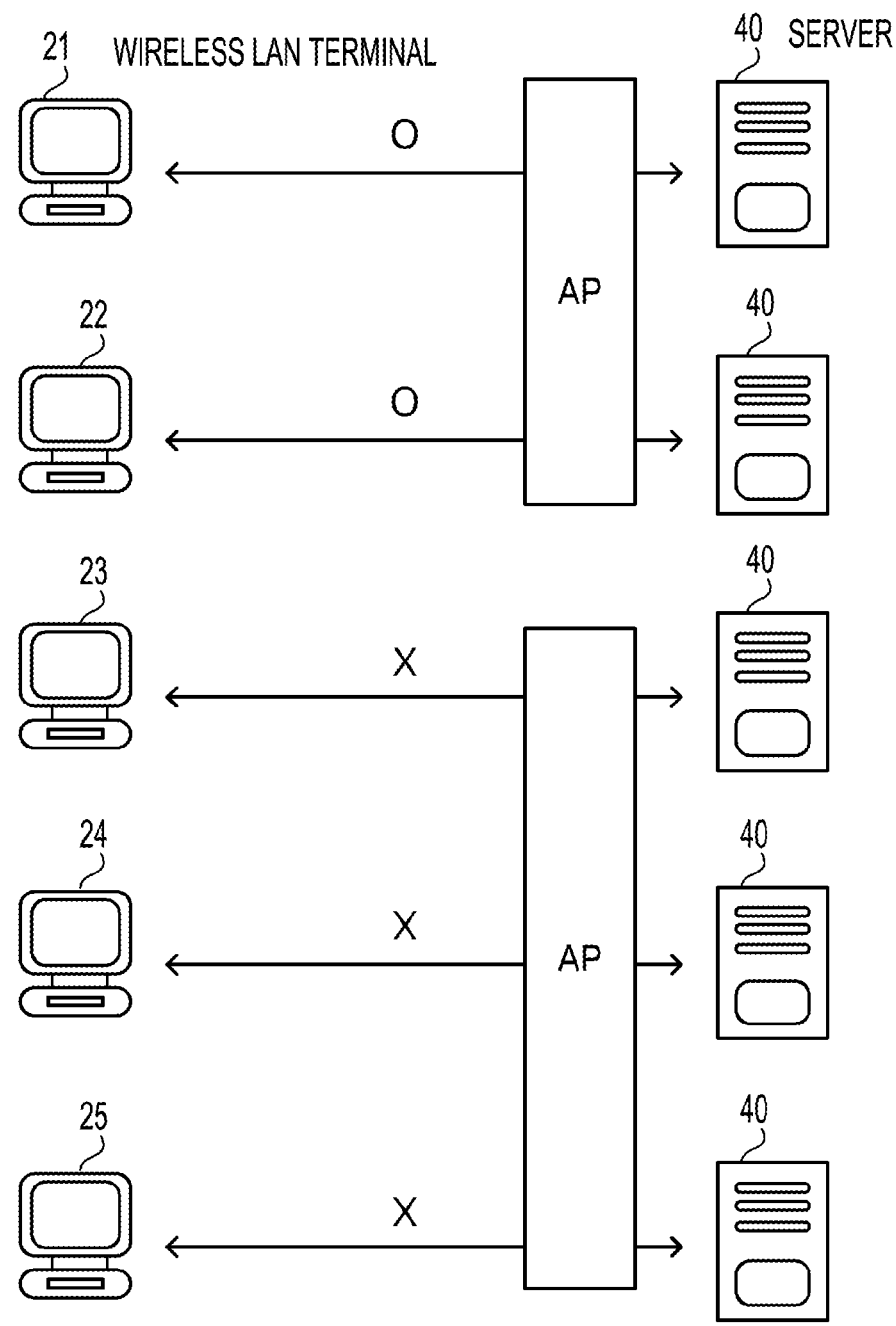
FIG. 22 is a diagram for explaining an operation of distinguishing a communication quality deteriorated portion.
Figure 23:
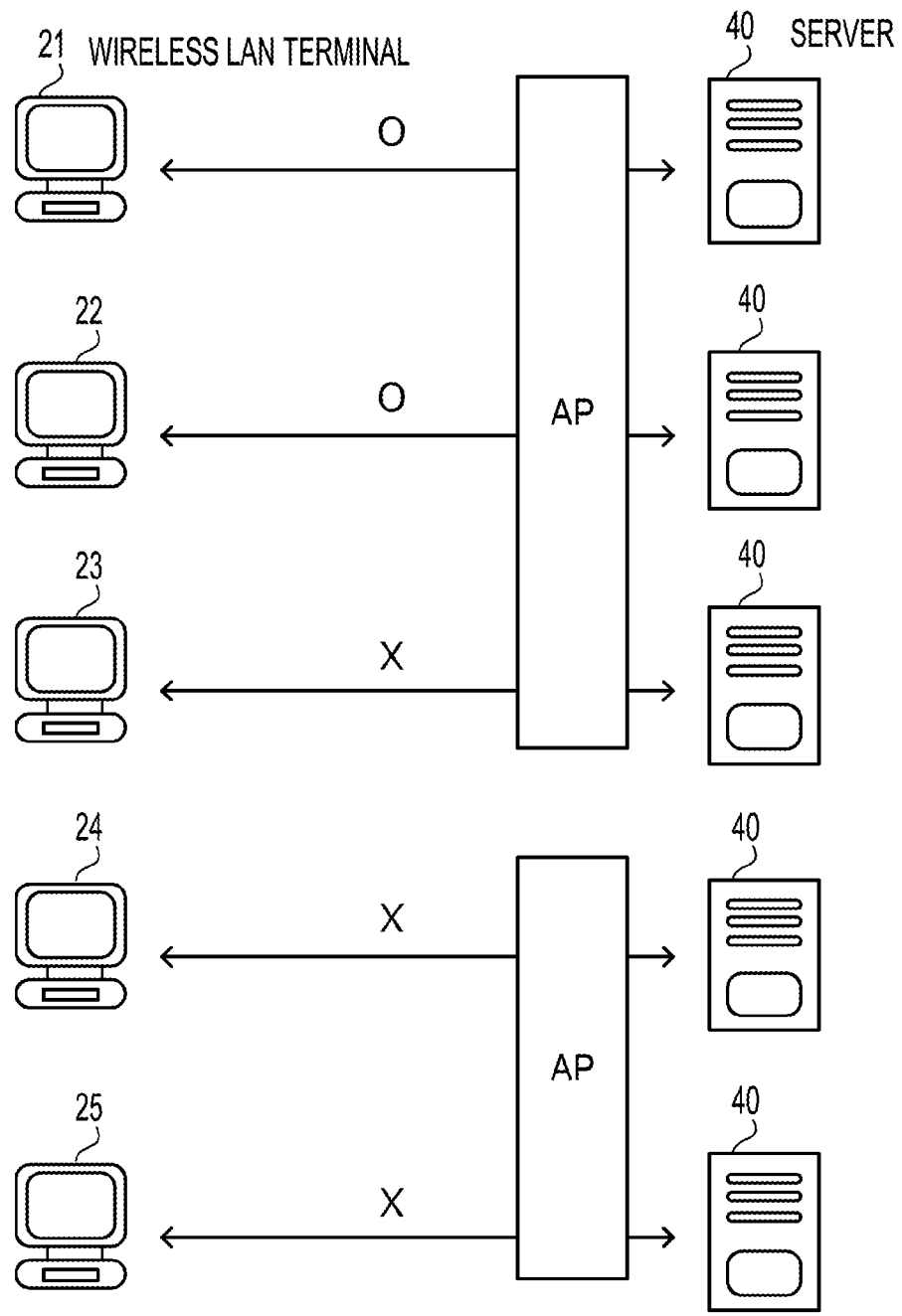
FIG. 23 is a diagram for explaining an operation of distinguishing a communication quality deteriorated portion.

FIGS. 22 and 23 are diagrams for explaining a distinguishing operation of a communication quality deteriorated portion. In FIGS. 22 and 23, the controller 11 recognizes that the communication quality between the wireless LAN terminal 21 and the server 40 is good, and the communication quality between the wireless LAN terminal 22 and the server 40 is good.

Further, the controller 11 recognizes that the communication quality between the wireless LAN terminal 23 and the server 40 is in a deteriorated state, the communication quality between the wireless LAN terminal 24 and the server 40 is in a deteriorated state, and the communication quality between the wireless LAN terminal 25 and the server 40 is in a deteriorated state.

In FIG. 22, the controller 11 determines from the determination result of the identity determination processing that the wireless LAN terminals 21 and 22 are connected to the same AP and the wireless LAN terminals 23, . . . , 25 are connected to the same AP.

Since it is determined that the wireless LAN terminals 23, . . . , 25 are connected to the same AP with respect to the wireless LAN terminals 23, . . . , 25 with deteriorated communication quality, the controller 11 determines that there is a high possibility that the cause of deterioration exists on the AP side.

Further, in FIG. 23, the controller 11 determines from the determination result of the identity determination processing that the wireless LAN terminals 21, 22, and 23 are connected to the same AP and the wireless LAN terminals 24 and 25 are connected to the same AP.

It is determined that the wireless LAN terminals 21, 22, and 23 are connected to the same AP with respect to the wireless LAN terminal 23 with deteriorated communication quality, and the wireless LAN terminals 21, 22 are in good communication. Therefore, the controller 11 determines that there is a high possibility that the cause of deterioration exists on the wireless LAN terminal 23 side.

In addition, since it is determined that the wireless LAN terminals 24 and 25 are connected to the same AP with respect to the wireless LAN terminals 24 and 25 with deteriorated communication quality, the controller 11 determines that there is a high possibility that the cause of deterioration exists on the AP side.

Figure 24:
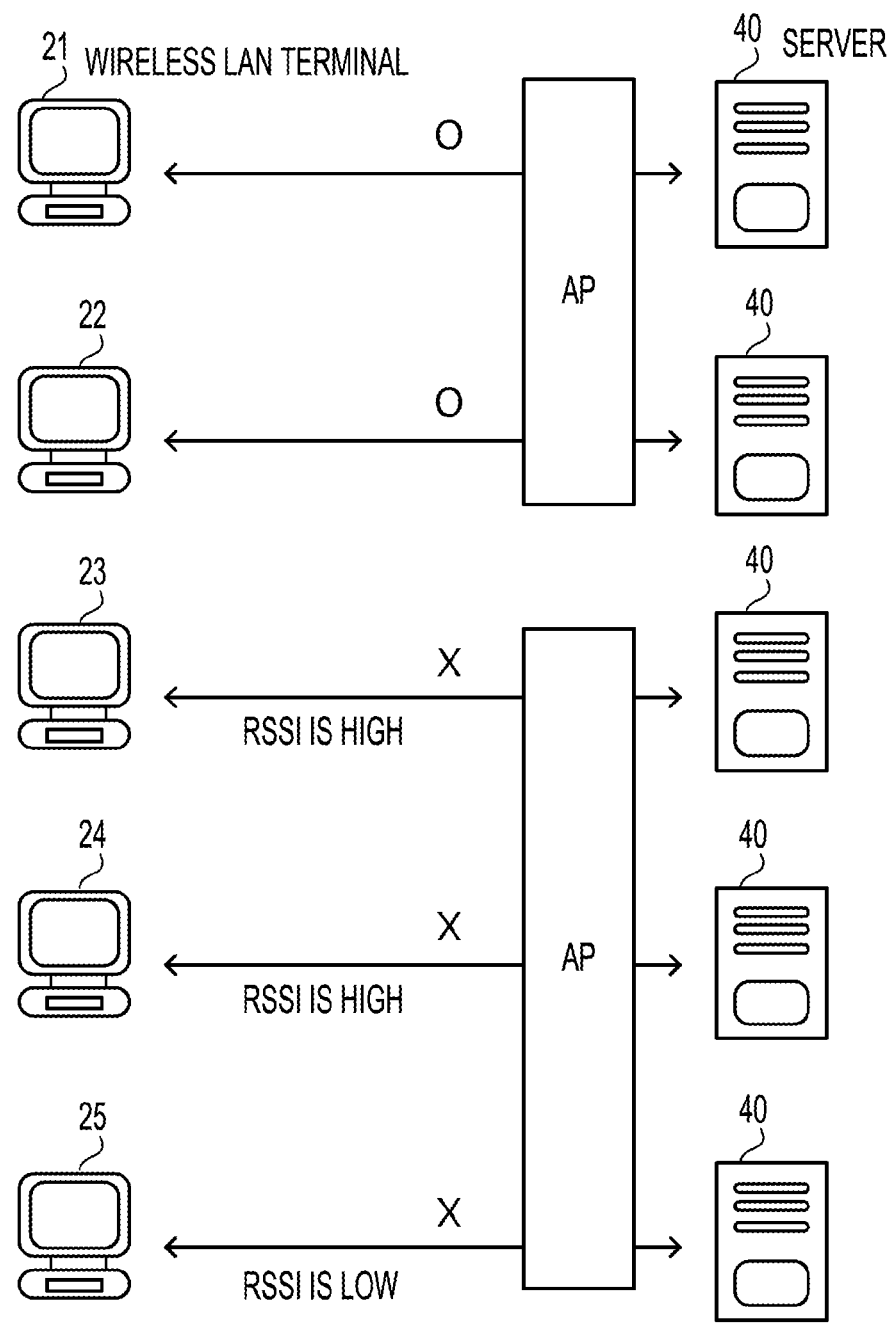
FIG. 24 is a diagram for explaining an operation of distinguishing a communication quality deteriorated portion.

FIG. 24 is a diagram for explaining a distinguishing operation of a communication quality deteriorated portion. The figure illustrates an example of a case where it is recognized that the cause of deterioration exists on the wireless LAN terminal side even when the communication quality of all the wireless LAN terminals connected to the same AP deteriorates.

In FIG. 24, the controller 11 recognizes that the communication quality between the wireless LAN terminal 21 and the server 40 is good, and the communication quality between the wireless LAN terminal 22 and the server 40 is good.

Further, the controller 11 recognizes that the communication quality between the wireless LAN terminal 23 and the server 40 is in a deteriorated state, the communication quality between the wireless LAN terminal 24 and the server 40 is in a deteriorated state, and the communication quality between the wireless LAN terminal 25 and the server 40 is in a deteriorated state.

Here, it is assumed that the controller 11 recognizes that the received signal strength indicator (RSSI) of the wireless LAN terminals 23 and 24 is at a sufficiently high level to perform a stable wireless LAN communication. In addition, the controller 11 recognizes that the RSSI of the wireless LAN terminal 25 is at a low level to perform a stable wireless LAN communication.

It is determined that the wireless LAN terminals 23, 24, and 25 are connected to the same AP with respect to the wireless LAN terminals 23, 24, and 25 with deteriorated communication quality, and among the wireless LAN terminals 23, 24, and 25, the RSSI of only the wireless LAN terminal 25 is low. Therefore, in the controller 11, the wireless LAN terminal 25 with a low RSSI is present among the wireless LAN terminals 23, 24, and 25 connected to the same AP, and due to this influence, it is determined that communication deterioration occurs also in the other wireless LAN terminals 23 and 24 under the same AP.

The processing functions of the packet analyzing apparatuses 1 and 10 of the present disclosure described above may be implemented by a computer. In this case, a program is provided to describe the processing contents of the functions that the packet analyzing apparatuses 1 and 10 need to have. The above-described processing functions are implemented on the computer by executing the program by the computer.

The program describing the processing contents may be recorded in a computer-readable recording medium. The computer-readable recording medium includes a magnetic storage device, an optical disk, a magneto-optical recording medium, a semiconductor memory, and the like. The magnetic storage device includes a hard disk device (HDD), a flexible disk (FD), a magnetic tape, and the like. The optical disk includes a CD-ROM/RW and the like. The magneto-optical recording medium includes a magneto optical disk and the like.

When distributing a program, for example, a portable recording medium such as a CD-ROM in which the program is recorded is sold. Further, the program may be stored in the storage device of a server computer, and the program may be transferred from the server computer to another computer via the network.

The computer that executes the program stores, for example, the program recorded in the portable recording medium or the program transferred from the server computer in its own storage device. Then, the computer reads the program from its own storage device and executes a processing according to the program. Further, the computer may read the program directly from the portable recording medium and execute a processing according to the program.

In addition, each time the program is transferred from the server computer connected via a network, the computer may sequentially execute a processing according to the received program. Further, at least a part of the above processing functions may be implemented by electronic circuits such as DSP, ASIC, PLD, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
acquiring a first packet group and a second packet group at a predetermined location in a network, the first packet group being wirelessly transmitted from a first wireless communication device and received by one of a plurality of wireless base stations connected to the network, the second packet group being wirelessly transmitted from a second wireless communication device and received by one of the plurality of wireless base stations;
accumulating the first packet group and the second packet group in a memory in an arrival order;
detecting a consecutive number of packets in which a first packet among the first packet group and a second packet among the second packet group are accumulated alternately and consecutively one packet at a time in a time series, the consecutive number having a predetermined value or more; and
determining whether the first wireless communication device and the second wireless communication device are connected to a same wireless base station based on a frequency of appearance of the consecutive number.

2. The non-transitory computer-readable recording medium according to claim 1, the process further comprising:
determining that the first wireless communication device and the second wireless communication device are connected to different wireless base stations, respectively, when the frequency of appearance of the consecutive number exceeds a threshold value; and
determining that the first wireless communication device and the second wireless communication device are connected to the same wireless base station when the frequency does not exceed the threshold value.

3. The non-transitory computer-readable recording medium according to claim 2, the process further comprising:
detecting a maximum value of the consecutive number for each of at least one first period based on the first packet group and the second packet group which are acquired in a second period including the at least one first period; and
calculating, as the frequency, a ratio of a number of part of the at least one first period in which the maximum value is equal to or greater than a predetermined value against a number of the at least one first period.

4. The non-transitory computer-readable recording medium according to claim 3, the process further comprising:
excluding, from the calculation of the ratio, a first period among the at least one first period, in which communication amounts of acquired packets among the first packet group and acquired packets among the second packet group are equal to or less than a predetermined value.

5. The non-transitory computer-readable recording medium according to claim 3, the process further comprising:
excluding, from the calculation of the ratio, a first period among the at least one first period, in which a packet size of an acquired packet is equal to or less than a predetermined value.

6. The non-transitory computer-readable recording medium according to claim 3, the process further comprising:
excluding, from the calculation of the ratio, a first period among the at least one first period, which does not satisfy a condition that a connection used for communications of packets among the first packet group and a connection used for communications of packets among the second packet group are continuously established from a beginning to an end.

7. The non-transitory computer-readable recording medium according to claim 1, the process further comprising:
determining that the first wireless communication device and the second wireless communication device are connected to different wireless base stations, respectively, when the frequency of appearance of the consecutive number exceeds a first threshold value; and
determining that the first wireless communication device and the second wireless communication device are connected to the same wireless base station when the frequency does not exceed a second threshold value which is smaller than the first threshold value.

8. A packet analysis method, comprising:
acquiring, by a computer, a first packet group and a second packet group at a predetermined location in a network, the first packet group being wirelessly transmitted from a first wireless communication device and received by one of a plurality of wireless base stations connected to the network, the second packet group being wirelessly transmitted from a second wireless communication device and received by one of the plurality of wireless base stations;
accumulating the first packet group and the second packet group in a memory in an arrival order;
detecting a consecutive number of packets in which a first packet among the first packet group and a second packet among the second packet group are accumulated alternately and consecutively one packet at a time in a time series, the consecutive number having a predetermined value or more; and
determining whether the first wireless communication device and the second wireless communication device are connected to a same wireless base station based on a frequency of appearance of the consecutive number.

9. An information processing apparatus, comprising:
a memory; and
a processor coupled to the memory and the processor configured to:
acquire a first packet group and a second packet group at a predetermined location in a network, the first packet group being wirelessly transmitted from a first wireless communication device and received by one of a plurality of wireless base stations connected to the network, the second packet group being wirelessly transmitted from a second wireless communication device and received by one of the plurality of wireless base stations;
accumulate the first packet group and the second packet group in the memory in an arrival order;
detect a consecutive number of packets in which a first packet among the first packet group and a second packet among the second packet group are accumulated alternately and consecutively one packet at a time in a time series, the consecutive number having a predetermined value or more; and determine whether the first wireless communication device and the second wireless communication device are connected to a same wireless base station based on a frequency of appearance of the consecutive number.

10. The non-transitory computer-readable recording medium according to claim 1, wherein the predetermined value of the consecutive number is 3.

* * * * *